(12) United States Patent
Smith et al.

(10) Patent No.: US 8,830,556 B2
(45) Date of Patent: Sep. 9, 2014

(54) METAMATERIALS

(75) Inventors: David R. Smith, La Jolla, CA (US); David Schurig, San Diego, CA (US); Anthony F. Starr, San Diego, CA (US); Jack J. Mock, Cardiff by the Sea, CA (US)

(73) Assignee: The Regents of the University of California, Oakland, CA (US)

( * ) Notice: Subject to any disclaimer, the term of this patent is extended or adjusted under 35 U.S.C. 154(b) by 198 days.

(21) Appl. No.: 13/229,092

(22) Filed: Sep. 9, 2011

(65) Prior Publication Data
US 2011/0317275 A1 Dec. 29, 2011

Related U.S. Application Data

(63) Continuation of application No. 12/424,300, filed on Apr. 15, 2009, now Pat. No. 8,040,586, which is a continuation of application No. 11/658,358, filed as application No. PCT/US2005/026052 on Jul. 22, 2005, now Pat. No. 7,538,946.

(60) Provisional application No. 60/590,702, filed on Jul. 23, 2004.

(51) Int. Cl.
  *G02F 1/23* (2006.01)
  *G02F 1/03* (2006.01)
  *H01P 7/00* (2006.01)
  *H01P 7/06* (2006.01)

(52) U.S. Cl.
  USPC ........ 359/278; 359/245; 359/247; 333/219.2; 333/227; 343/909; 250/505.1

(58) Field of Classification Search
  USPC ......... 359/290–295, 298, 652, 278, 245–247; 333/33, 227, 230, 219.2; 703/5
  See application file for complete search history.

(56) References Cited

U.S. PATENT DOCUMENTS

| | | | |
|---|---|---|---|
| 2,804,545 A | 8/1957 | Clark, Jr. | |
| 2,988,636 A | 6/1961 | Frost | |
| 3,934,566 A | 1/1976 | Ward | |
| 4,136,954 A | 1/1979 | Jamieson | |
| 5,012,212 A * | 4/1991 | Matsui et al. | 333/227 |
| 5,027,071 A * | 6/1991 | Hardy et al. | 324/309 |
| 5,128,088 A | 7/1992 | Shimomura et al. | |
| 5,498,644 A | 3/1996 | Reo | |

(Continued)

FOREIGN PATENT DOCUMENTS

WO   WO 2004/020186   3/2004

OTHER PUBLICATIONS

J.B. Pendry, A.J. Holden, D.J. Robbins, and W.J. Stewart, "*Low frequency plasmons in thin-wire structures*", J. Phys.: Condens. Matter 10 (Jan. 1998), pp. 4785-4809.

(Continued)

*Primary Examiner* — Loha Ben
(74) *Attorney, Agent, or Firm* — Greer, Burns & Crain, Ltd.

(57) ABSTRACT

One exemplary metamaterial is formed from a plurality of individual unit cells, at least a portion of which have a different permeability than others. The plurality of individual unit cells are arranged to provide a metamaterial having a gradient index along at least one axis. Such metamaterials can be used to form lenses, for example.

42 Claims, 16 Drawing Sheets

(56) References Cited

U.S. PATENT DOCUMENTS

| | | | |
|---|---|---|---|
| 5,600,342 | A | 2/1997 | Pikulski et al. |
| 5,606,335 | A | 2/1997 | English et al. |
| 5,635,453 | A | 6/1997 | Pique et al. |
| 5,661,591 | A * | 8/1997 | Lin et al. ............ 359/290 |
| 5,926,309 | A | 7/1999 | Little |
| 6,034,638 | A | 3/2000 | Thiel et al. |
| 6,097,271 | A | 8/2000 | Kozakoff |
| 6,117,517 | A | 9/2000 | Diaz et al. |
| 6,462,859 | B1 | 10/2002 | Bastiaens et al. |
| 6,469,682 | B1 | 10/2002 | de Maagt et al. |
| 6,483,481 | B1 | 11/2002 | Sievenpiper et al. |
| 6,759,985 | B2 | 7/2004 | Acher et al. |
| 6,791,432 | B2 | 9/2004 | Smith et al. |
| 6,882,460 | B2 | 4/2005 | Tsu et al. |
| 6,915,040 | B2 | 7/2005 | Willner et al. |
| 7,015,865 | B2 | 3/2006 | Isaacs et al. |
| 7,397,055 | B2 | 7/2008 | Barker et al. |
| 7,440,205 | B2 | 10/2008 | Malfait et al. |
| 7,443,508 | B1 | 10/2008 | Vrhel et al. |
| 7,522,124 | B2 | 4/2009 | Smith et al. |
| 7,522,328 | B2 | 4/2009 | Wagner et al. |
| 7,538,946 | B2 | 5/2009 | Smith et al. |
| 7,697,192 | B2 | 4/2010 | Wagner et al. |
| 7,760,053 | B2 | 7/2010 | Kochergin |
| 8,114,489 | B2 | 2/2012 | Nemat-Nasser et al. |
| 8,120,546 | B2 | 2/2012 | Smith et al. |

OTHER PUBLICATIONS

J.B. Pendry, A.J. Holden, W.J. Stewart, and I. Youngs, "*Extremely Low Frequency Plasmons in Metallic Mesostructures*", Physical Review Letters, vol. 76, No. 25, Jun. 17, 1996, pp. 4773-4776.

D.R. Smith, D.C. Vier, Willie Padilla, Syrus C. Nemat-Nasser, and S. Schultz, "*Loop-wire medium for investigating plasmons at microwave frequencies*," Applied Physics Letters, vol. 75, No. 10, Sep. 6, 1999, pp. 1425-1427.

V.G. Veselago, "*The Electrodynamics of Substances with Simultaneously Negative Values of* $\in$ *and* $\mu$", Soviet Physics Uspekhi, vol. 10, No. 4, Published Jan.-Feb. 1968, pp. 509-514.

J.B. Pendry, A.J. Holden, D.J. Robbins, and W.I. Stewart, "*Magnetism from Conductors and Enhanced Nonlinear Phenomena*," IEEE Transactions on Microwave Theory and Techniques, vol. 47, No. 11, Nov. 1999, pp. 2075-2084.

D.R. Smith, Willie J. Padilla, D.C. Vier, S.C. Nemat-Nasser, S. Schultz, "*A composite medium with simultaneously negative permeability and permittivity*", Preprint Jan. 2000, pp. 1-5.

R.N. Bracewell; Analogues of an ionized medium. *Wireless Engineer*, 31:320-6, Dec. 1954.

W. Rotman; Plasma simulation by artificial dielectrics and parallel-plate media *IRE Transactions on Antennas and Propagation*, pp. 82-95, Jan. 1962.

W. Bruns; *Gdfidl; A finite difference program for arbitrarily small perturbations in rectangular geometries. IEEE Transactions on Magnetics*, 32(3):1453-1456, May 1996.

D.R. Smith, R. Dalichaouch, N. Kroll, S. Schultz, and P.M. McCall, S.L. and Platzman; Photonic band structure and defects in one and two dimensions. *Journal of the Optical Society of America B*, 10(2):314-21, Feb. 1993.

D. R. Smith, J. J. Mock, A. F. Starr, D. Schuring, "Gradient Index Metamaterials," Phys. Rev. E. vol. 71, Mar. 17, 2005. 036609.

R. B. Greegor, et al. "Simulation and Testing of a Graded Negative Index of Refraction Lens," Appl. Phys. Lett., Vo. 87, Aug. 25, 2005, 091114.

Gay-Balmaz P., "Electromagnetic resonances in individual and coupled split-ring resonators," Journal of Applied Physics, vol. 92, No. 5, Sep. 1, 2001.

J.B. Pendry, D.R. Smith, "Reversing Light: Negative Refraction," Physics Today, Jun. 2004, p. 36-43.

Verma A. K. et al., "Resonance Frequency of Anisotropic Multilayer Rectangular Microstrip Patch using MWM," Electronics Letters, IEE Stevenage, GB, vol. 34, No. 4. Feb. 19, 1998.

Losada V. et al., "Full-wave analysis of circular microstrip resonators in multilayered media containing uniaxial anisotropic dielectrics, magnetized ferrites, and chiral materials," IEEE Transactions on Microwave Theory and Techniques, vol. 48, No. 6. Jun. 6, 2000.

Lindell I. V., et al., "BW media-media with negative parameters, capable of supporting backward waves," Microwave and Optical Technology Letters, vol. 31, No. 2. Oct. 20, 2001.

R.A. Shelby, D. R. Smith, S. Schultz, "Experimental Verification of a Negative Index of Refraction," Science, U.S.A., Apr. 6, 2001, vol. 292 pp. 77-79.

\* cited by examiner

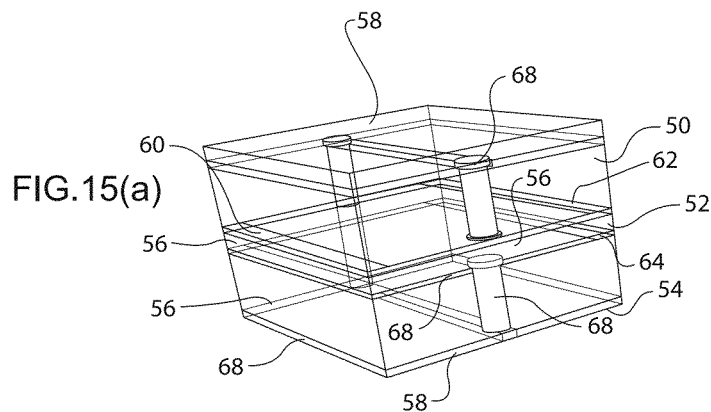
FIG.15(a)
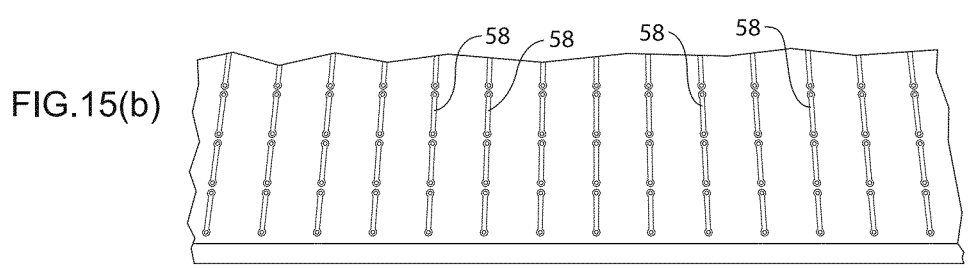
FIG.15(b)
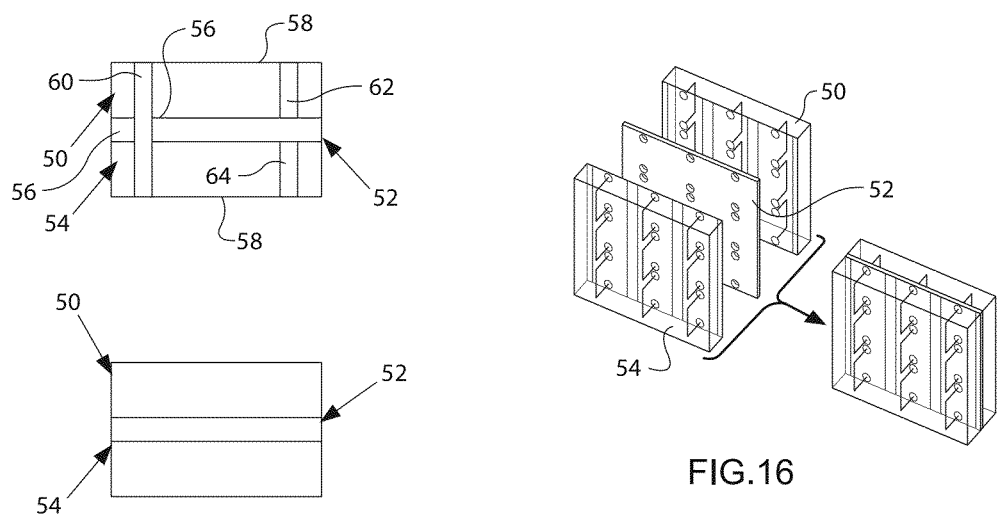
FIG.15(c)
FIG.16

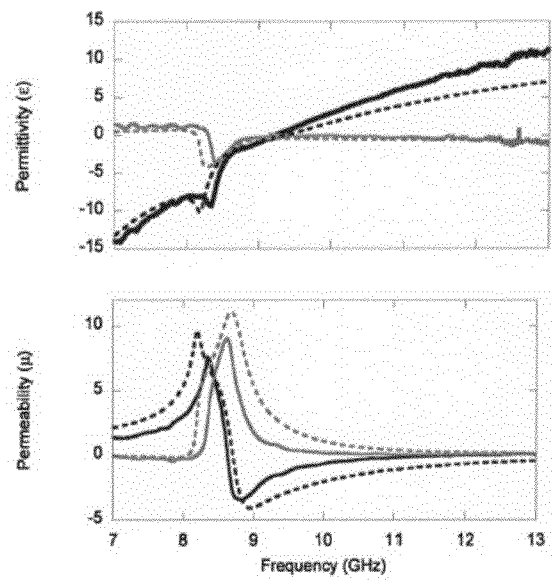
FIG. 19
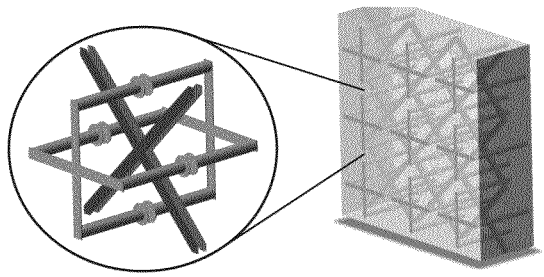
FIG. 20
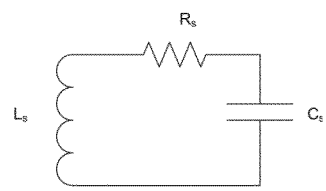
FIG. 21(a)
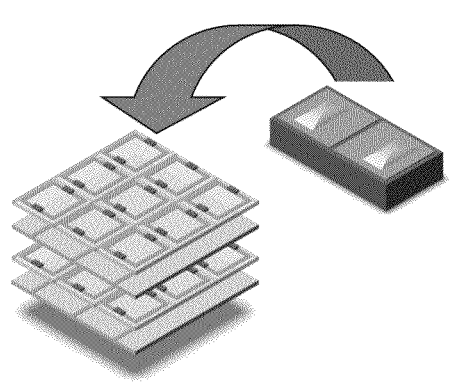
FIG. 22
FIG. 21(b)

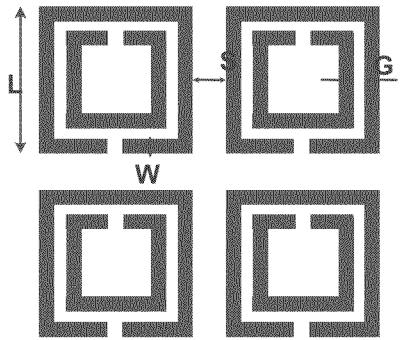
FIG. 24(a)
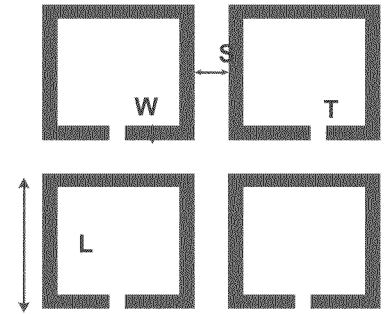
FIG. 24(b)
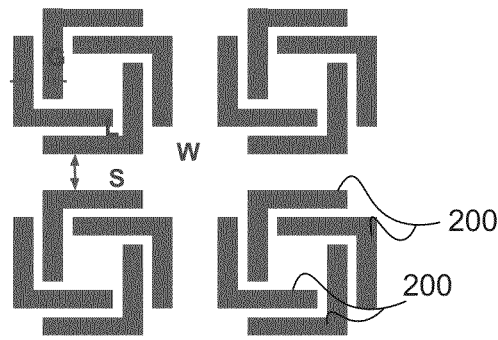
FIG. 24(c)
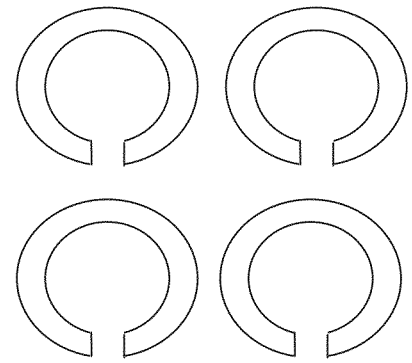
FIG. 24(d)
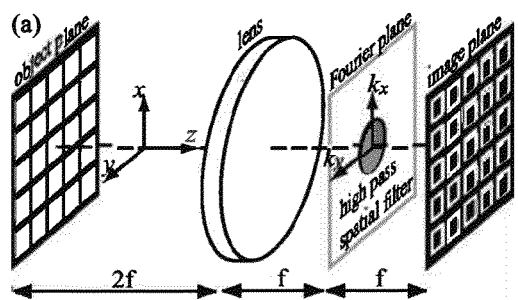
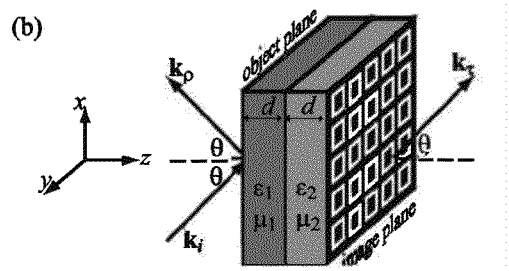
FIG. 26(a) and (b)

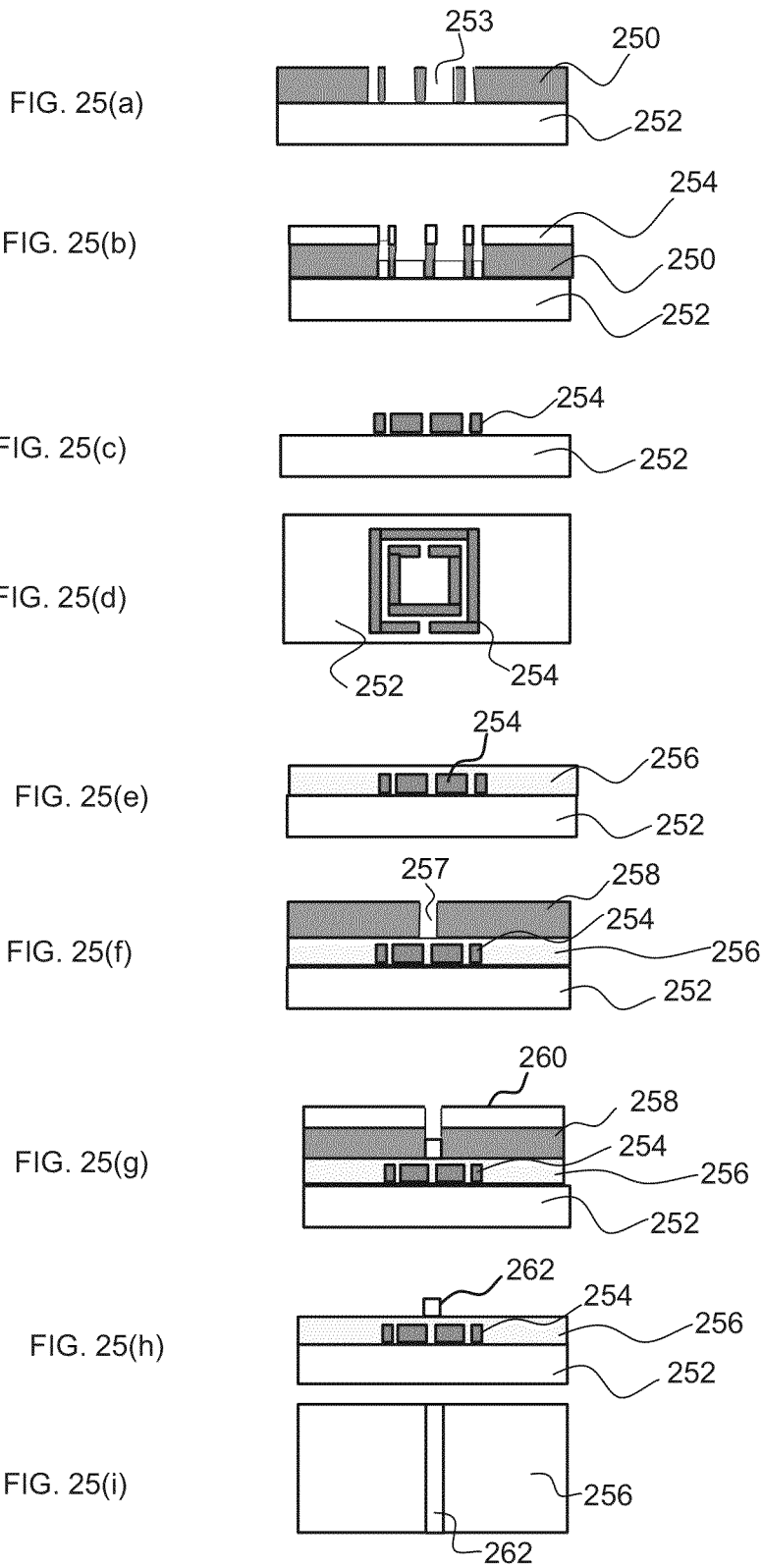

METAMATERIALS

PRIORITY CLAIM

This is a continuation of application Ser. No. 12/424,300 filed Apr. 15, 2009, now U.S. Pat. No. 8,040,586, which is a continuation of Ser. No. 11/658,358 filed Jan. 22, 2007, now U.S. Pat. No. 7,538,946 (incorporated by reference herein), which is a national stage entry of International Application PCT/US2005/026052, filed Jul. 22, 2005 which is a non-provisional of U.S. provisional application No. 60/590,702, filed Jul. 23, 2004.

STATEMENT OF GOVERNMENT INTEREST

This invention was made with Government support under DE-FG03-93ER40793 awarded by Department of Energy and under DMR-9623949 and DMR-9724535 awarded by National Science Foundation. The Government has certain rights in this invention.

TECHNICAL FIELD

A field of the invention is metamaterials. Another field of the Invention is composite metamaterials. Another field of the invention is lenses and optics. Another field of the invention is magnetics.

BACKGROUND ART

There have been demonstrations, including those by the present inventors and their colleagues, in which electromagnetic material response—either previously unobserved or otherwise difficult to achieve in conventional materials—has been obtained in artificially structured materials referred to herein as metamaterials. An example of unusual metamaterial response can be found in negative index metamaterials, which possess simultaneously negative permittivity ($\in$) and permeability ($\mu$) over a finite frequency band. The fundamental nature of negative refraction has revealed a key role that metamaterials can play in materials physics, as negative index is a material property not available in existing materials.

A generic description of material response can be found in the Drude-Lorentz model, which leads to the following frequency dispersive forms for $\in$ and $\mu$:

$$\varepsilon(\omega) = 1 - \frac{\omega_{pe}^2}{\omega^2 - \omega_{0e}^2 + i\Gamma_e \omega}$$

$$\mu(\omega) = 1 - \frac{\omega_{pm}^2}{\omega^2 - \omega_{0m}^2 + i\Gamma_m \omega}.$$

These forms, or very similar expressions, have been shown to describe not only conventional material response, but also the response of artificially structured metamaterials. At frequencies greater than the resonant frequency ($\omega_{0e}$ or $\omega_{0m}$), either $\in$ or $\mu$ will have negative values.

Metamaterials can be designed that have either electric or magnetic resonances where there are no equivalent existing materials. Electric and magnetic resonances can be situated at any frequency in metamaterial structures. In particular, by combining electric and magnetic structures, it is possible to arrive at a material with a frequency band over which both $\in$ and $\mu$ are simultaneously negative. The refractive index, n, for such a material, determined by taking the square root of the product $\in\mu$, is real, indicating the material is transparent to radiation. However, it has been shown that the correct choice for the sign of the square root is negative when both $\in$ and $\mu$ are negative. Thus, materials for which $\in$ and $\mu$ are both negative can be also characterized as negative index materials (NIMs).

Prior art metamaterials include a collection of macroscopic cells that constitutes an array of split ring resonators. These examples are described in previous work by some of the present inventors and their colleagues. U.S. Patent Publication No. US-2001-0038325-A1, and its application Ser. No. 09/811,376, filed Mar. 16, 2001, entitled Left Handed Composite Media, now U.S. Pat. No. 6,791,432 are also incorporated by referenced herein.

The demonstration of negative refractive index materials have confirmed various theories concerning the properties that would be possessed by negative refractive index materials. Many basic electromagnetic and optical principles need to be reconsidered as the basic physical explanations have always considered right handed magnetic materials and positive refractive indexes.

DISCLOSURE OF THE INVENTION

A summary of some inventive features will be provided here to highlight some aspects of the invention. Additional inventive features may be found in the preferred embodiment description, attached hereto. In some embodiments of the invention, metamaterials are structured to achieve optical effects. Optics and optical effects, as used herein, includes the manipulation of electromagnetic waves, as well as visible wavelengths. In an embodiment of the invention, negative index metamaterials are optimized to produce negative index lenses. In another embodiment of the invention, metamaterials are modified to be form diffractive optical devices. In another embodiment of the invention, metamaterials are modified to form gradient index optical devices.

In embodiments of the invention, optical devices have effects that may be scaled. Scaling may be used to fabricate metamaterials, including negative index lenses, diffractive optical devices, and gradient index optical devices over a wide range of frequencies, i.e., from low (RF, microwave) frequencies to high (mm, THz) frequencies. Negative index metamaterial lenses of the invention demonstrate reduced aberrations compared to positive index lenses. For an example embodiment planoconcave negative index metamaterial lens of the invention, an index value of −0.61 minimizes aberrations. As exemplary metamaterials of the invention are formed from macroscopic cells, and because physical characteristics (dimensions, type of dielectric material, relative positions, geometry, etc.) may be varied, it is possible to optimize optical effects in other negative index lenses and in the devices of the invention in general. The effects are more easily achieved at THz and lower, but the nature of the metamaterials will permit realization of the optical effects at visible wavelengths as well.

Exemplary metamaterials of the invention are formed by a plurality of macroscopic cells. This presents a number of advantages in the formation of optical and other devices. In the case of diffractive optical devices of the invention, the surface profile of the metamaterial is tailored with a diffractive surface that produces broader frequency bandwidth (less chromatic aberration) and other advantages. The properties of the metamaterial may also be tailored cell-by-cell to produce a gradient index optic. Gradient index lenses are used in many optical applications. Metamaterials offer advantages in that the index profile can be specifically tailored as needed to provide focusing, beam steering, beam shaping or other optical functionality. Because metamaterials are based on macroscopic cells, active control and tuning on a cell-by-cell basis of the material may be realized. Combining this control, which can be implemented by active electronic devices or by electromechanical devices, with the gradient index concept, adaptive optical devices may be realized.

BRIEF DESCRIPTION OF THE DRAWINGS

FIGS. 15(a)-15(c) illustrate an exemplary metamaterial of the invention;

FIG. 16 illustrates an exemplary metamaterial of the invention;

FIG. 19 is useful to illustrate properties of an exemplary metamaterial of the invention;

FIG. 20 illustrates an exemplary metamaterial of the invention;

FIGS. 21(a) and 21(b) schematically illustrate an aspect of an exemplary metamaterial of the invention;

FIG. 22 schematically illustrates an aspect of an exemplary metamaterial of the invention;

FIGS. 24(a)-24(d) schematically illustrate conductor resonators useful in various metamaterials of the invention;

FIGS. 25(a)-25(i) schematically illustrate an exemplary method for making a metamaterial of the invention;

FIGS. 26(a) and 26(b) are useful to illustrate an exemplary metamaterial of the invention;

BEST MODE OF CARRYING OUT THE INVENTION

Figure 1:
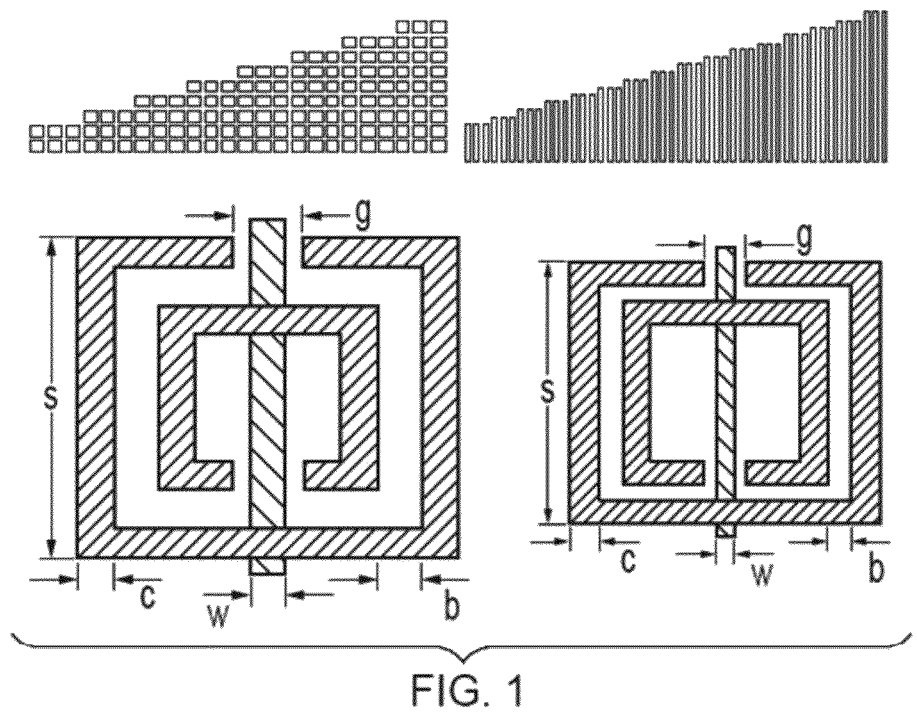
FIG. 1 illustrates various views of an exemplary metamaterial of the invention.

Embodiments of the present invention are directed to various new metamaterials that significantly extend the range of metamaterial properties, enabling the potential for new physical and optical behavior, as well as unique electromagnetic devices. A metamaterial is an artificially structured material that includes a plurality of elements that are patterned in one or more dimensions, with each element having physical dimensions less than or on the order of an incident wavelength in the direction of wave propagation, and where each element is configured to exhibit desired electric and magnetic polarizations in response to an applied electromagnetic field. In many (but not all) metamaterials, the elements are made from conductors and are supported by a dielectric substrate. Preferred examples of elements include lattices of straight wire conductors and lattices of split ring resonators.

As used herein, the term "supported" as used in the term "supported by a dielectric substrate" (or "host") is intended to be broadly interpreted, and is not intended to be limited to being held on a surface of a substrate. A conductor may be contained or embedded within a dielectric substrate, for instance, and be "supported by" the dielectric substrate. The terms "dielectric" and "dielectric host" as used herein are intended to broadly refer to an electrically insulating material whose dielectric constant is greater than or equal to about +1, and preferably greater than +1. A dielectric host may be a gas such as air, or may be a substrate such as a dielectric polymer, glass, quartz, and the like.

Exemplary metamaterials consist of a dielectric host supporting repeated unit cells of identical elements (i.e., a periodic structure) such as conductors. Other exemplary metamaterials may be formed from a heterogeneous collection of elements designed to produce gradients in one or more of the effective medium parameters of permittivity, permeability, refractive index or wave impedance.

The present invention is directed to metamaterials designed to accomplish specific functions. For example, embodiments of the present invention are directed to metamaterials designed to exhibit a spatial variation in index. Other embodiments of the present invention are directed to methods for fabricating metamaterials. Embodiments of the invention may find useful applications in the fields of optics and lenses, among others. It will be appreciated that as used herein the term "optics" and "lenses" are intended to be broadly interpreted and not limited to apparatuses operable only at optical wavelengths. A "lens" may include an apparatus useful to manipulate electromagnetic waves, for example, that are not in the visible frequency. Exemplary metamaterials of the invention, including metamaterial lenses, interact with propagating free-space waves, and are not bound in any dimension.

The present invention may be further discussed and described through the exemplary embodiments discussed below.

A. Enhanced Diffraction from a Grating on the Surface of a Negative Index Metamaterial One aspect of the present invention is directed to negative index materials having surface characteristics optimized to tune refraction and diffraction. It has been discovered that the coupling to diffracted beams is enhanced at the interface between a positive and a negative index material. Because diffractive optics are essentially patterned gratings, embodiments of the present invention utilize a specified grating in a negative index material as a lens element. The design of the grating may be based on Eq. 1 below. Using this relationship, a negative index grating lens may be optimized using traditional optical methods. One important benefit of this embodiment of the invention is that the efficiency is so much greater using metamaterials, so that much more compact lenses than are available in the prior art are realizable.

An exemplary embodiment includes a negative index material formed at whatever frequency is appropriate and fashioned into a grating structure designed to focus or otherwise manipulate light or other electromagnetic waves.

Numerical simulation as well as by measurements on negative index metamaterial wedge samples shows the unavoidable stepping of the refraction interface—due to the finite unit-cell size inherent to metamaterials—can give rise to a well-defined diffracted beam in addition to the negatively refracted beam. The direction of the diffracted beam is consistent with elementary diffraction theory; however, the coupling to this higher order beam is much larger than would be the case for a positive index material.

Recent demonstrations of artificial materials with negative refractive index (n) have initiated an exploration into the use of these materials to investigate new physics and to develop new applications. So many exotic and remarkable electromagnetic phenomena have been predicted to occur in negative index materials, such as reversed Cerenkov radiation and reversed Doppler shifts, that even the most basic of electromagnetic and optical phenomena must be carefully reexamined in the context of negative index media. For example, in an analysis of the imaging properties of a planar slab of n=−1, it has been predicted that resolution exceeding that of any positive index optical component may be realizable.

An artificial medium composed of two interspersed lattices of conducting elements was fabricated and reported to have a negative index of refraction. A wedge sample composed of this material, as shown in FIG. 1 has been demonstrated to refract microwaves in a manner consistent with the material having a negative refractive index. The medium was composed of a two dimensional arrangement of conducting split ring resonators (SRRs) that provided the equivalent of a negative permeability over a band of frequencies from ~11.0 GHz to 11.5 GHz, and wire strips that provided a frequency band of negative permittivity over a larger and overlapping frequency range. Both the SRR's and the wire strips are supported by a dielectric substrate.

In the sample used, the unit cell size of 5 mm was roughly a factor of six smaller than the free space wavelength, so that the material could be expected to be reasonably characterized by effective medium theory. The finite unit cell size, however, led to an unavoidable stepping of the surface: to achieve the 18.4 degree refraction surface, the metamaterial surface was cut in steps of three unit cells by one unit cell, as indicated in FIG. 1 (top left). The resulting surface C stepping was thus on the order of $\lambda/2$.

FIG. 1 (top left) is a schematic diagram of a metamaterial wedge used to demonstrate negative refraction. The structure is patterned in two dimensions, as indicated by the white lines in the Fig. FIG. 1 (top right) is a schematic diagram showing one unit cell of a metamaterial wedge of the invention. This exemplary wedge is made of unit cells having a dimension of 2.5 mm, and is patterned in only one dimension as indicated (i.e., as columns). FIG. 1 (bottom left) is a schematic diagram of the SRR used in FIG. 1 (top left), with dimensions s=2.63 mm; c=0.25 mm; b=0.3 mm, g=0.46 mm; w=0.25 mm; FIG. 1 (bottom right) is a schematic of one unit SRR of the present invention used in the metamaterial of FIG. 1 (top right), with dimensions s=2.2 mm, c=0.2 mm, b=0.15 mm, g=0.3 mm, w=0.14 mm. The dielectric substrate used is 0.25 mm thick FR4 circuit board ($\in$=3.8), with a copper thickness of about 0.014 mm.

The surface stepping on the metamaterial sample constitutes a grating, which could be expected to generate a diffracted beam in addition to the zeroth order refracted beam. The condition for the generation of zeroth and higher order beams can be determined from the well known grating formula $$\sin\theta = \frac{m\lambda}{d} + n\sin\theta_m, \qquad (1)$$

where $\theta_m$ is the angle of incidence to the normal to the interface from the medium side and $\theta$ is the refraction angle. Eq. 1 accounts both for refraction (second term) as well as diffraction (first term).

The elementary arguments leading to Eq. 1 do not allow the relative coupling of the incident beam to the various possible outgoing beams to be determined. A theoretical analysis of the plane wave diffraction from a grating between positive and negative index materials predicts an enhanced coupling to the diffracted orders. This enhanced coupling can be understood by the following argument. A wave incident on a periodically patterned surface will couple to all transmitted and reflected waves whose wave vectors along the interface match that of the incoming wave (kx) to within a reciprocal lattice vector (i.e., kx+mπ/d, where m is an integer). This set of modes includes both propagating components—the zeroth order refracted wave and higher diffracted orders—in addition to evanescent components for which (kx+mπ/d)>ω/c. The reflection and transmission coefficients for the evanescent waves generated at the surface between a positive and a negative index medium have far greater magnitude than those generated at the surface between two media of the same index sign. In a perturbative sense, the grating modulation leads to a coupling between the incident beam and all diffracted beams, mediated by the evanescent components. As these components can have very large magnitude between positive and negative media, the coupling between the incident beam and higher orders is also correspondingly much larger.

Figure 3:
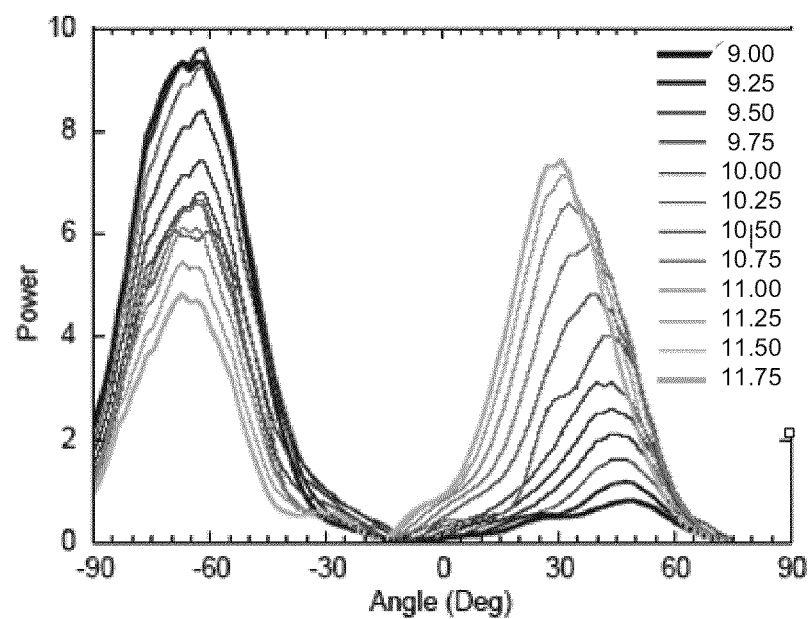
FIG. 3 is useful to illustrate properties of an exemplary metamaterial of the invention.

To explore the properties of diffracted beams in a negative index sample, we simulate a wave incident on the interface between a negative index wedge and free space, as shown in FIG. 3. The simulation is performed using the driven solution in a finite-element based electromagnetic mode solver. The simulated geometry is similar to that used in the experiments, except that the wedge is treated as a homogeneous material with negative $\in$ and μ rather than an array of SRRs and wires. A finite-width incident beam is established by driving one end of a 6 cm wide channel, 1 cm in height, lined with absorber. The absorber guides the wave to the flat surface of the sample wedge. For the case of a wedge sample with a smooth refraction interface, a single refracted beam is always observed at an angle determined by Snell's law (i.e., no diffracted beams), whether the refractive index is positive or negative.

Figure 2:
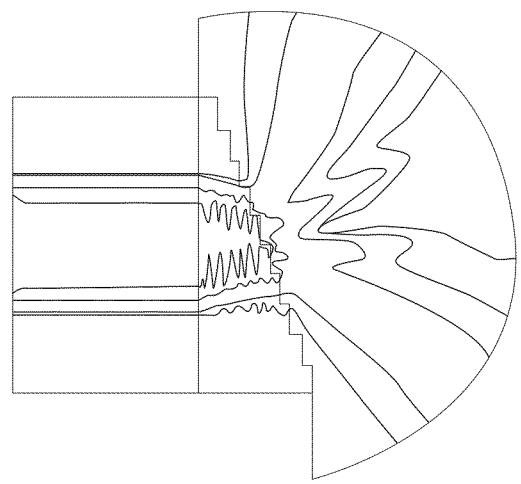
FIG. 2 is useful to illustrate properties of an exemplary metamaterial of the invention.

A surface stepping added to a positive index wedge produces a single refracted beam identical to that of the smooth wedge; however, a surface stepping added to the negative index wedge shown in FIG. 2 results in the appearance of a second beam.

FIG. 2 is a field plot showing the refracted and diffracted beams at the stepped interface of a negative index wedge. For the wedge in this simulation, ∈=−5.09 and μ=−1.41, so that n=−2.68. The frequency for the simulation is 11.5 GHz. The steps along the refraction surface of the wedge have dimensions 15 mm by 5 mm. In analogy to the experiments, a 1 cm high (in the direction perpendicular to the page) and 6 cm wide guided region is simulated, bounded by electric boundary conditions (parallel to the page). The refracted and diffracted beams exit the slab at angles of −58° and +30°, respectively, in agreement with Eq. 1.

The parameters for the geometry in the simulation presented in FIG. 2 when used in Eq. 1 suggest a zeroth order refracted beam at −58° from the surface normal, and a first order diffracted beam at an angle that depends on the apparent grating length. Eq. 1 indicates that a change in the wavelength of the incident beam with the index of the wedge held constant shifts the angle of deflection of the first order beam, but not that of the zeroth order beam. This can be seen in the angular power spectra presented in FIG. 3. FIG. 3 illustrates simulated angular power spectra at a radius of 40 mm away from the surface of the stepped negative index wedge of FIG. 1. Each curve corresponds to a different incident wavelength (frequency). All angles are relative to the refraction surface normal.

The different curves in FIG. 3 correspond to different values of the incident excitation frequency, which was varied from 9.0 GHz through 11.75 GHz, with all other parameters kept constant. The peak angle of the first order peak as a function of frequency (or wavelength) can be used to determine empirically the value of d, the inverse of which enters as the coefficient to the wavelength in Eq. 1. While the physical surface step size is 15×5 mm, suggesting d~16 mm, a fit to the data from FIG. 3 indicates an apparent grating step size of d=19 mm. This extracted value of d fits the observed simulation data well over frequencies from 11.75 GHz down to about 10 GHz.

Below 8.5 GHz, the right hand side of Eq. 1 exceeds unity, and a diffracted beam is no longer possible. We thus expect that the coupling strength of the diffracted beam would approach zero near this frequency, which is consistent with the simulation results. The numerical study of FIG. 3 provides an indication of the relative coupling of the incident wave to the zeroth and first order beams. The relative magnitude of the diffracted peak versus the refracted peak increases as the wavelength becomes smaller, to the point that the diffracted beam can dominate the scattering spectrum. A similar numerical study, in which the frequency was held constant while the surface step size was changed, revealed similar results to those shown in FIG. 3.

While the simulations presented here are based on continuous, homogeneous materials, the artificially structured negative index metamaterials can also be approximated as continuous materials. It is thus believed and expected that the surface stepping in such metamaterials will lead to the same diffraction phenomenon found in the simulations described above on homogeneous, stepped wedge samples.

The simulations above indicate that for the sample used in FIG. 1 (top left) a secondary beam should be observed in the frequency regime where the refractive index is negative. A secondary beam was not reported in the initial experiments, but was observed in a similar experiment. Because of the design details of the sample, the plates were separated by roughly 2 mm more than the 10 mm (0.4 inch) standard X-band spacing, leading to a source of variability in the experiments.

To further study and clarify experimentally the issue of higher order beams, we perform an angle-resolved mapping of the fields transmitted by each of two different metamaterial wedge samples as a function of frequency. One of the samples is that used in FIG. 1(top left), having the dimensions indicated in FIG. 1 (bottom left). The other wedge sample utilized a new unit cell design shown in FIG. 1 (bottom right).

The apparatus used for the experiments is based on a parallel plate waveguide as is known. An incident beam having minimal transverse phase variation is generated by coupling microwaves from an X-band coax-to-waveguide adapter (HP X281A) into a channel of parallel plate wave guide. Absorber (Microsorb Technologies Inc. MTL-73) is patterned so as to gently widen along the path of the beam from the 0.9" width of the adapter, forming an exit aperture of roughly 15 cm (6"). The channel is connected to a parallel plate semicircular central chamber, in the center of which is placed the metamaterial sample. The length of the channel (coax adapter to exit aperture) is 40 cm. A waveguide detector is positioned at the radius of the semicircular plates, a distance of 40 cm from the sample, and is capable of being swept over an angular range of nearly 180 degrees.

As a control, the angular distribution of power refracted from a Teflon sample, with the same dimensions and surface step size as the sample of FIG. 1 (top left) is measured. The result, shown in FIG. 3, reveals that the beam was refracted to a positive angle, as expected. No other diffracted beam is detected, although over the frequency range shown, Eq. 1 predicts that a first order mode could occur (−63° at 11.5 GHz, for example).

In contrast to positive index media, negative index media is inherently frequency dispersive. The expected frequency region of negative refraction for the sample used by in FIG. 1 (top left) was from 10.5 GHz to 11.1 GHz, but these limits are somewhat nebulous due to the positioning of the upper and lower plates relative to the sample. In the present study, the chamber plates are fixed at a distance of 1.27 cm (0.5").

Figure 4:
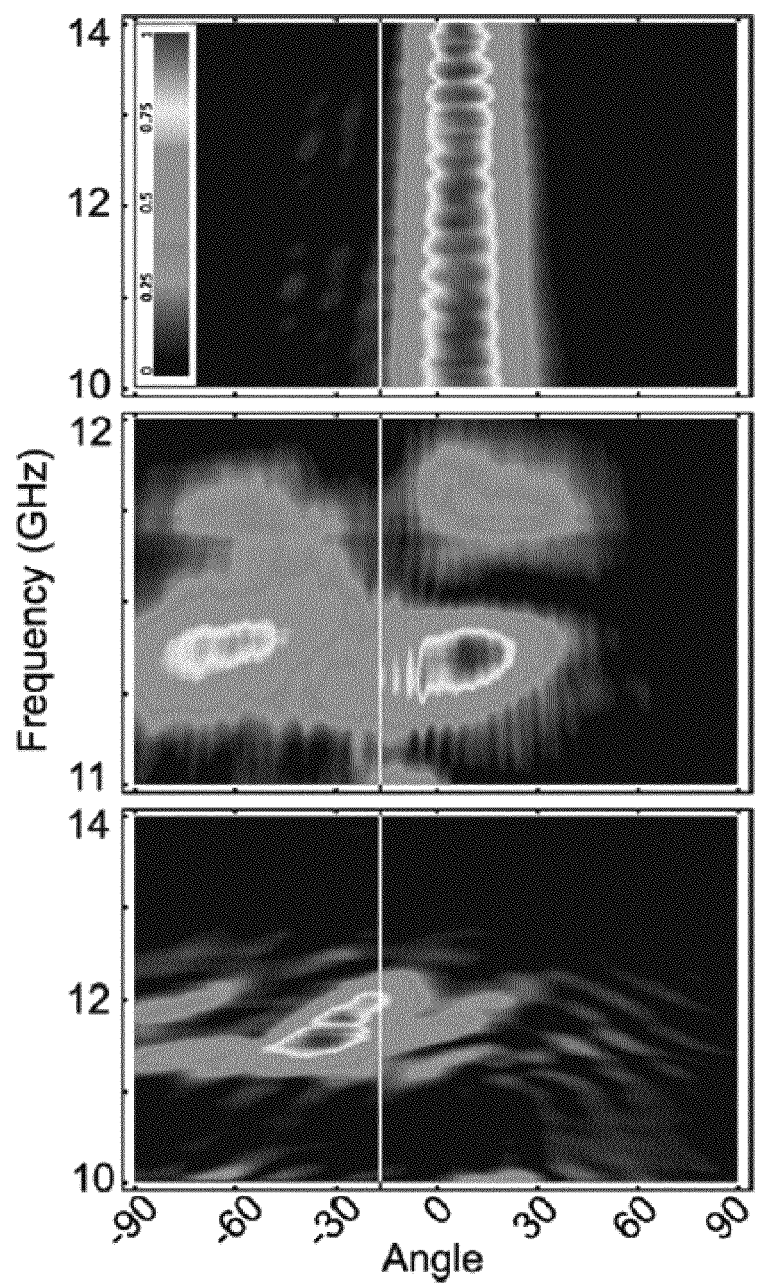
FIG. 4 is useful to illustrate properties of an exemplary metamaterial of the invention.

FIG. 4 is a map of the transmitted power as a function of frequency (vertical axis) and angle away from direct incidence (horizontal axis), for (top) a Teflon wedge with 15 mm×5 mm steps; (center) the wedge of FIG. 1 (top left) (and bottom) the 2.5 mm stepped surface wedge metamaterial of the invention. As can be seen from FIG. 4 (center), at frequencies coincident with the expected negative index frequency band, the incident beam is indeed bent to negative angles. In addition, as Eq. 1 suggests, there is also a secondary beam at positive angles corresponding to the first order diffracted beam. The position and dispersion of the diffracted beam is consistent with Eq. 1, assuming the value of d derived from the simulation analysis in FIG. 3.

The agreement is quite good considering the simplicity of the theory, which assumes a continuous medium. These results suggest that not only does the bulk metamaterial behave as a continuous material with negative refractive index, but also the surface stepping contributes to the properties and can be modeled as steps in an otherwise continuous material.

It has been discovered, and confirmed by both Eq. 1 and the simulations, that by reducing the size of the unit cell by a modest amount, effectively reducing the refraction surface grating length, the diffracted beam can be eliminated. An embodiment of the present invention includes a new metamaterial sample with stepped surface having a unit step size of 2.5 mm—half the size of that used in FIG. 1 (top left) unit cell in the plane of propagation. The "step size" refers to the length of each unit cell along the length of the 3-unit cell step, as well as the vertical distance separating each step from one another. A schematic of the wedge sample is indicated schematically in FIG. 1 (top right), while the detailed dimensions of the metamaterial unit cell are shown in FIG. 1 (bottom right) and discussed in detail above. The refraction surface angle is again 18.4°, and is stepped 3 unit cells by 1 unit cell.

A map of the transmitted power as a function of frequency and angle for the 2.5 mm sample is shown in FIG. 4 (bottom). The predicted left-handed band, as determined from simulations on the new unit cell, occurs from 11.3 GHz to 12.2 GHz. The measured spectrum, as anticipated, exhibits negatively refracted power over this band of frequencies, and most importantly no diffracted band appears.

The simulations presented here, as well as the experimental data in FIG. 4, serve to illustrate the role of surface inhomogeneity in refraction experiments on negative index media. Although the metamaterial samples represent somewhat complicated systems, our results and analysis show that Eq. 1 correctly accounts for the presence of both the zeroth and higher order beams. Furthermore, the results confirm the enhanced coupling to diffractive orders for negative index samples. This increased coupling represents an important distinction between the behavior of positive and negative index media, and suggests that surface periodicity plays a much more significant role in the latter.

B. Negative Index Lens Aberrations

Another aspect of the present invention is related to negative index lenses. In recent years, there has been great interest in negative index artificial materials ("NIM"). One area of interest includes the perfect lens concept. A perfect lens is a flat slab of index minus one, which can focus images with resolution exceeding that possible with positive index optics. Focusing by a curved surface on negative index media is possible. Traditional spherical profile lenses composed of negative index media have several advantages over their positive index counterparts: they are more compact, they can be perfectly matched to free space. Further, it has been discovered that they can also have superior focusing performance.

Exemplary metamaterial lenses of the invention are configured as composite structures whose electromagnetic properties are made to vary spatially throughout the composite. Importantly, both the permittivity and the permeability can be varied independently throughout the structure of the invention, leading to previously unrealized optical devices. An exemplary embodiment is an artificially structured composite metamaterial consisting of a dielectric substrate or host material supporting a plurality of conducting elements, each of which is designed so as to exhibit desired electric and magnetic polarizations in response to an electromagnetic field, the composite exhibiting a desired spatial variation in the permittivity and/or permeability along one or more axes, such that at least one element differs in its electric or magnetic polarization from the other elements. As used herein the term "spatial variation" is intended to be broadly interpreted as meaning a variation with spatial position. For example, a metamaterial having a permeability that exhibits spatial variation may have a permeability that varies with position along one or more of the X, Y and Z axis in the metamaterial.

Importantly, the spatial variation in magnetic permeability is independent from said electric permittivity—permeability and permittivity may be "tuned" separately from one another in metamaterials of the invention. Such metamaterials have many useful and beneficial applications. For example, in some exemplary metamaterials of the invention a ratio of the magnetic permeability to the electric permittivity is maintained substantially constant and substantially equal to the same ratio for a material adjacent to or surrounding the metamaterial (with examples including free space or a second material in which the composite metamaterial is embedded), so that impedance matching is achieved. Also, the sign of the metamaterial permeability and permittivity can be controlled, with both being negative in some exemplary metamaterials to provide a negative index metamaterial. These and other advantages and benefits will be clear to those knowledgeable in the art when considering the detailed discussion of exemplary embodiments that follows.

The monochromatic imaging quality of a lens can be characterized by the five Seidel aberrations: spherical, coma, astigmatism, field curvature and distortion. These well known corrections to the simple Gaussian optical formulas are calculated from a fourth order expansion of the deviation of a wave front from spherical. (A spherical wave front converges to an ideal point focus in ray optics). The coefficients in this expansion quantify the non-ideal focusing properties of an optical element for a given object and image position. We find that there is an asymmetry of several of the Seidel aberrations with respect to index about zero. Considering that an interface with a relative index of +1 is inert and one of relative index −1 is strongly refractive, this asymmetry is not surprising. However, the present discovery that the asymmetry can yield superior focusing properties for negative index lenses is a surprising and unexpected result.

Negative index media are necessarily frequency dispersive, which implies increased chromatic aberration and reduced bandwidth. However, diffractive optics, which possesses a similar limitation, has found utility in narrow band applications. To confirm the analytical aberration results, custom ray tracing code has been developed that does not rely on the sign of the index to determine the path of the ray, but relies only on the permittivity, $\epsilon$, the permeability, $\mu$, Maxwell's equations and conservation of energy. Between interfaces, in homogenous media, the ray propagates in a straight line following the direction of the Poynting vector. Refraction across an interface, from a region labeled 1 into a region labeled 2, is handled as follows. Wave solutions are sought that satisfy the dispersion relation (obtained from Maxwell's equations) in region 2, $$\frac{c^2}{\omega^2} k_2 \cdot k_2 = \epsilon_2 \mu_2, \qquad (1)$$

where $k_2$ is the wave vector in region 2. The solutions must also satisfy a boundary match to the incident wave, requiring $$n \times (k_2 - k_1) = 0, \qquad (2)$$

where n is the unit normal to the interface. The outgoing, refracted, wave must carry energy away from the surface if the incident wave carried energy in, $$(P_2 \cdot n)(P_1 \cdot n) > 0, \qquad (3)$$

where $P = 1/2 \, \text{Re}\,(E \times H^*)$ is the time averaged Poynting vector. Finally, the wave must not be exponentially growing or decaying, $I_m(k_2) = 0$, since the media are assumed passive and lossless. If a solution exists that satisfies all the above criteria, the ray is continued with the new found wave vector and Poynting vector. Furthermore, since we consider only isotropic media the solution will be unique.

It has been discovered that the form of the expressions for the Seidel aberrations of thin spherical lenses found in the optics literature are unchanged by the consideration of negative index media. This conclusion is confirmed by re-deriving these expressions, from first principles, using only the definition of optical path length and Fermat's Principle. We interpret the optical path length, $OPL = \int_C n(s)ds$, to be the phase change (in units of free space wavelength) that a wave would undergo along the path C, if C is oriented parallel to the Poynting vector. The optical path may have contributions that are negative where the Poynting vector and the wave vector are antiparallel, i.e. where the index is negative. These aberration formula are further corroborated by agreement with the results of our ray tracing. The wave aberration, $\Delta OPL$, is the difference in optical path length of a general ray and a reference ray, where the reference ray passes through the optic axis in the aperture stop and the general ray is parameterized by its coordinate in the aperture stop, r, and its coordinate in the image plane, h as shown by FIG. 5.

Figure 5:
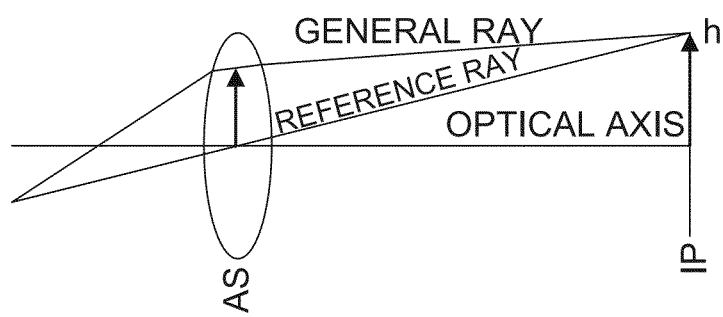
FIG. 5 is useful to illustrate properties of an exemplary metamaterial of the invention.

FIG. 5 illustrates the construction used for aberration calculation. The aperture stop, labeled AS, is at the place of the thin lens (though lens shown is thick). The Gaussian image plane is labeled IP. The aperture stop coordinate vector, r, and the image plane coordinate vector, h, are not necessarily parallel as shown.

To be in the Gaussian optic limit, where spherical interfaces yield perfect imaging, r and h must be near zero. A series expansion of the wave aberration in these parameters $$\Delta OPL = \sum_{l,m,n=0}^{\infty} C_{lmn}(r \cdot r)^l (r \cdot h)^m (h \cdot h)^n \quad (4)$$

yields corrections to Gaussian optics of any desired order. The lowest order corrections for a thin spherical lens with aperture stop in the plane of the lens are given by:

$$C_{200} = -\frac{1}{32f'^3 n(n-1)^2} \times [n^3 + \quad (5a)$$
$$(n-1)^2 (3n+2)p^2 + 4(n+1)pq + (n+2)q^2],$$

$$C_{110} = -\frac{1-p}{8f'^3 n(n-1)}[(2n+1)(n-1)p + (n+1)q], \quad (5b)$$

$$C_{020} = -\frac{(1-p)^2}{8f'^3}, \quad (5c)$$

$$C_{101} = -\frac{(1-p)^2}{16f'^3 n}(n+1), \quad (5d)$$

$$C_{011} = 0. \quad (5e)$$

These coefficients are the Seidel aberrations: spherical, coma, astigmatism, field curvature and distortion respectively. Also appearing in these expressions are p, the position factor, and q, the shape factor. The position factor is given by:

$$p \equiv 1 - \frac{2f'}{S'}, \quad (6)$$

where f' is the focal length referred to the image side and S' is the image position. Through the thin spherical lens imaging equation, $$\frac{1}{S'} - \frac{1}{S} = \frac{1}{f'} = (n-1)\left(\frac{1}{R_1} - \frac{1}{R_2}\right), \quad (7)$$

where S is the object position and $R_1$ and $R_2$ are the lens radii of curvature, the position factor is directly related to the magnification, $$M = \frac{S'}{S} = \frac{p+1}{p-1}. \quad (8)$$

The shape factor is given by $$q \equiv \frac{R_2 + R_1}{R_2 - R_1} \quad (9)$$

A lens with a shape factor of 0 is symmetric, and ±1 is a plano-curved lens. Using the shape and position factor, all thin spherical lens configurations are described.

First examined is the important case of a source object at infinite distance. This is a position factor of −1. We are left with two parameters that can be used to reduce aberrations, n and q. We will set the value of q to eliminate one of the aberrations and compare the remaining aberrations as a function of index. We will restrict our attention to moderate values of index. At large absolute values of index, the aberrations approach the same value independent of sign, but dielectric lenses with high index have significant reflection coefficients due to the impedance mismatch to free space. The usual ordering of the aberrations is from highest to lowest in the order of r, the aperture coordinate. This is the ordering of most image degradation to least if one is forming images with significant lens aperture, but small to moderate image size, which is a common occurrence in applications. Thus, spherical aberration is an obvious target for elimination. However, there are no roots of C200 for values of index greater than one, which is why this aberration is referred to as spherical aberration, since it appears to be inherent to spherical lenses. The preferred practice is to eliminate coma (the next in line), and it so happens that the resulting lens has a value for the spherical aberration that is very near the minimum obtainable. Adjusting the shape factor, q, is often called lens bending. If we bend the lens for zero coma, that is find the roots of C110 with respect to q we obtain $$q_c = \frac{(2n+1)(n-1)}{n+1}. \quad (10)$$

Figure 6:
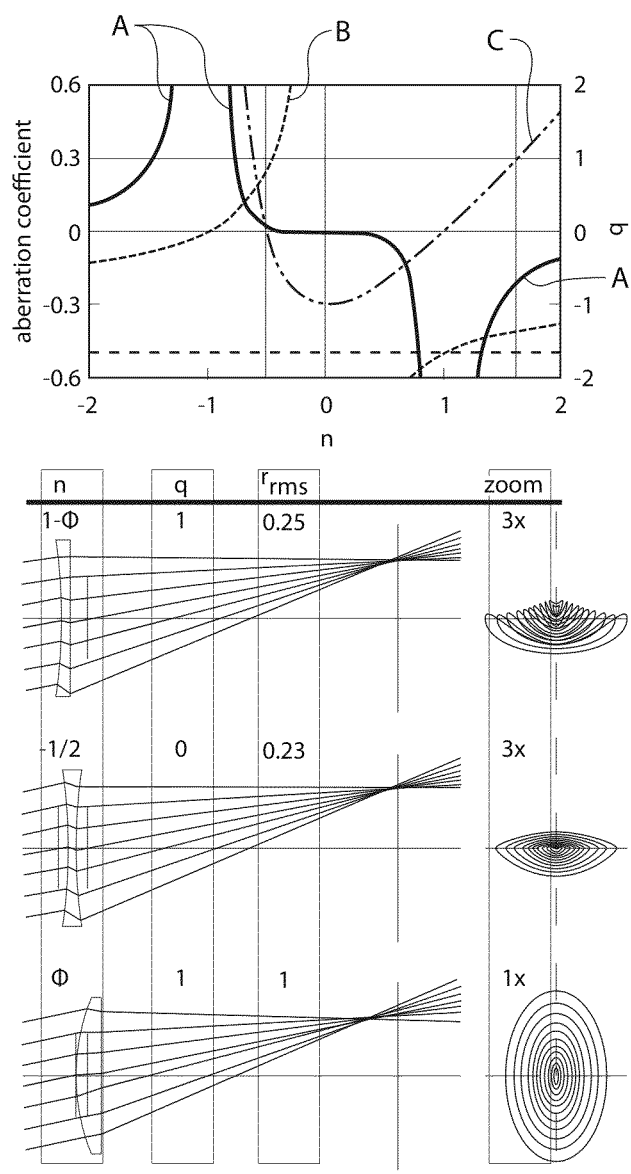
FIG. 6 is useful to illustrate properties of an exemplary metamaterial of the invention.

We plug this value for q and p=−1 into (5) and plot the remaining three non-zero aberration coefficients as well as $q_c$ in FIG. 6.

In FIG. 6, the top plot shows spherical aberration (A), astigmatism (bottom horizontal plot line), field curvature (B), and shape factor (C) as a function of index for a lens focusing an object at infinity and bent for zero coma. Thin vertical lines indicate properties for lenses shown in ray tracing diagrams (bottom), meridional profile (left) and image spot (right). Incident angle is 0.2 radians and lenses are f/2. Index shape factor, relative rms spot size, and spot diagram zoom are shown tabularly. In meridional profile, lens principle planes are shown as thin black vertical lines, and optic axis and Gaussian image plane are shown as gray lines. In spot diagram, Gaussian focus is at the center of cross hairs.

Note that there are two values of index where q=1, which represent a plano-concave/convex lens. Setting (10) equal to one we obtain, $$n^2 - n - 1 = 0. \quad (11)$$

the roots of which are the ubiquitous "golden" or most preferred ratios, n=Ø=about 1.62; and n=1−Ø'=about −0.62. We also note that there is a window of index values near n=−0.7 where both the spherical aberration and field curvature are small. There is no equivalent window in positive index. Accordingly, one embodiment of the invention is a lens made of a NIM having an index n of about −0.6 to about −0.7, with one preferred lens having an index of about −0.6.

Several ray tracing diagrams with both meridional rays and ray spot diagrams are shown for specific values of index in FIG. 6. The reference lens has index ϕ, which is close to typical values used in visible optical lenses and near enough to n=1 for reasonably low reflection. The lenses of negative index shown are in fact closer to n=−1, which is the other index which permits perfect transmission, so this is a fair comparison. The negative index lenses all show significantly tighter foci than the positive index lens. If we attempt to bend a lens with p=1 to obtain zero spherical aberration we obtain the two solutions $$q_s = \frac{2(n^2 - 1) \pm n\sqrt{1 - 4n}}{n + 2}. \quad (12)$$

These expressions have real values only for n≤¼, so an implementation of such a lens (embedded in free space) is not possible with normal materials.

Figure 7:
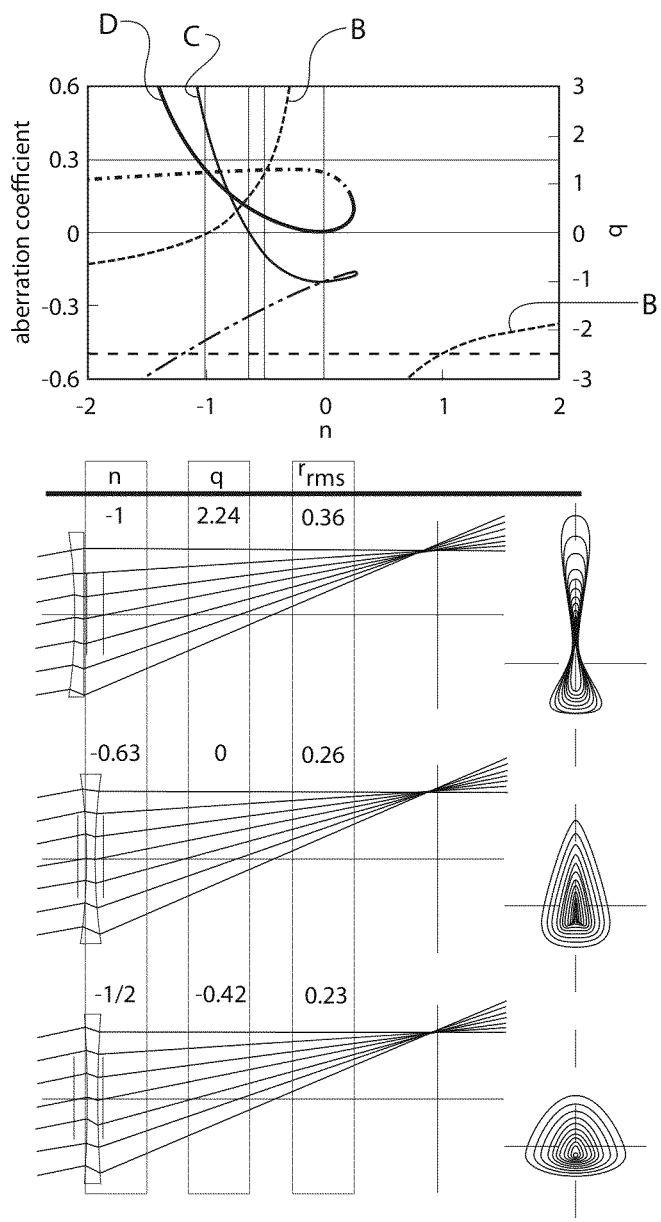
FIG. 7 is useful to illustrate properties of an exemplary metamaterial of the invention.

It is a surprising and significant result that negative index permits an entire family of spherical aberration free spherical lenses that can focus a distant object to a real focus, as illustrated by FIG. 7. FIG. 7 is the same as FIG. 6, except that the lens is bent for zero spherical aberration, coma is shown by (D). Solid and dashed lines indicate different solutions. Spot size $r_{rms}$ is relative to bottom lens spot in FIG. 7. All spot diagrams are at the same scale.

The solution with the negative sign in the expression for $q_s$ (solid curves) has less coma for moderate negative values of index, so ray tracing diagrams are shown for that solution. We note that at n=−1, the field curvature is also zero, thus this lens has only two of the five Seidel aberrations, coma and astigmatism. For a positive index reference we use the zero coma, n=ϕ lens from above. Here again, negative index lenses achieve a tighter focus than a comparable positive index lens.

Now we examine the case of |p|<1, which is a real object and real image both at finite position. Since p and q are both free parameters, we can conceivably eliminate two aberrations. If we eliminate spherical aberration and coma the resulting lens is called aplanatic. It is a well known, though not accurate, result that a spherical lens can only have virtual aplanatic focal pairs. The more accurate statement is that only negative index spherical lenses can have real aplanatic focal pairs. If we set C200 and C110 to zero and solve for p and q, we obtain four solutions, the two non-trivial ones are given by $$p_{oc} = \mp \frac{n+1}{n-1}, \quad (13a)$$

$$q_{oc} = \pm(2n+1). \quad (13b)$$

We will focus on the solution with a minus sign for p and the plus sign for q. This solution has smaller aberrations for lens configurations that magnify an image. The other solution is better for image reduction. Inserting the expressions (13) into (5) we have plotted the two remaining non-zero coefficient as well as the values of $p_{sc}$ and $q_{sc}$ in FIG. 8.

Figure 8:
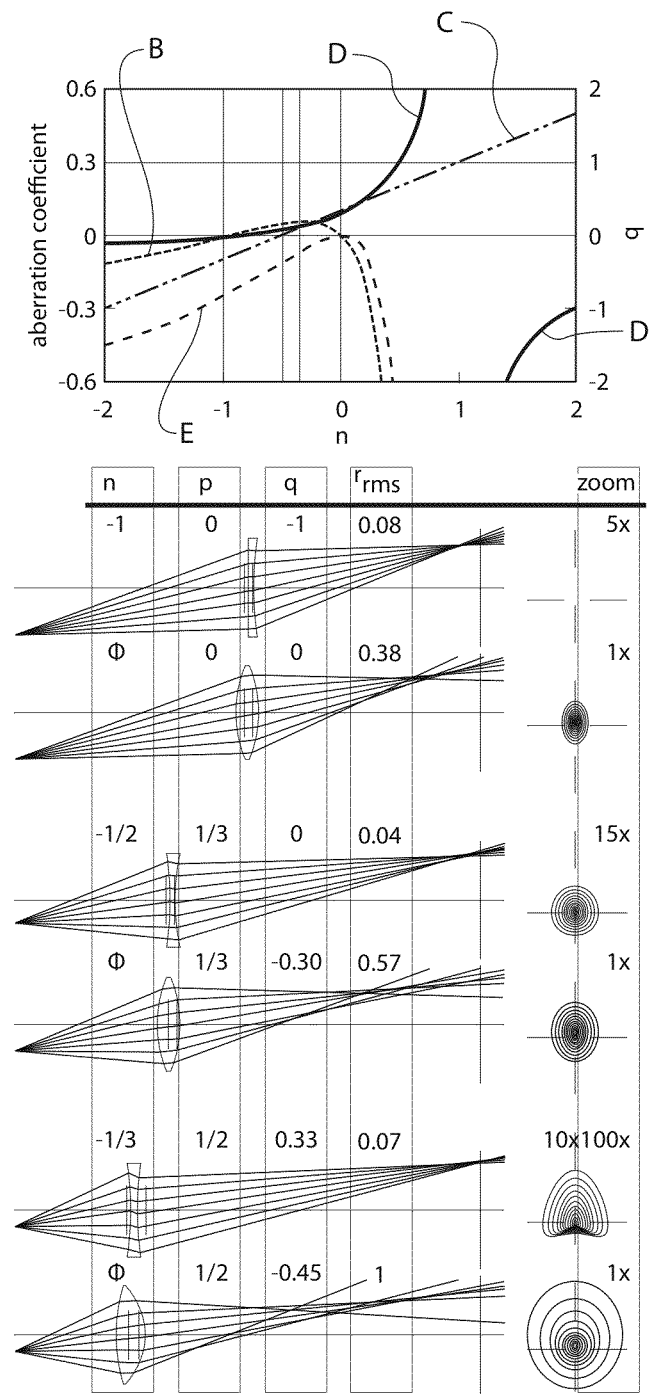
FIG. 8 is useful to illustrate properties of an exemplary metamaterial of the invention.

FIG. 8 is consistent with FIG. 7, except the following: Lens configuration with object and image as finite positions and bent for zero spherical aberration and coma. The position factor is shown as (D). Astigmatism (formerly horizontal plot line) is shown as (E). Real image object pairs only occur when position factor is in shaded region |p|<1. Lens pairs are f/1.23, f/1.08, f/0.90 and have magnifications −1, −2, −3. In second to last spot diagram, horizontal (10×) and vertical (100×) zoom are not equal.

Ray diagrams are shown for lenses with magnifications of −1, −2 and −3. Also shown is a reference positive index lens for each. The reference lenses (which cannot be aplanatic) are of moderate index, ϕ, with the same magnification and f/# as the lenses they are compared to. They are bent for zero coma but also have spherical aberration near the minimum possible for the configuration. Again, the negative index lenses produce superior foci.

The lens of index −1 and magnification −1 is particularly interesting. At this index value the field curvature is also zero. This remarkable lens configuration has only one of the five Seidel aberrations, astigmatism. This is confirmed by ray tracing which shows a one dimensional "spot" at the image plane. This is perfect focusing in the sagittal plane. Perfect focusing also occurs in the meridional plane, in front of sagittal focus. One may ask why this asymmetric lens, q=1, performs so well in a symmetric configuration, p=0. This lens can be equivalently viewed as a biconcave doublet with one component. We found that all biconcave doublets with arbitrary indices of ±n have identical focusing properties. The only observable difference is in the internal rays, which are always symmetric about the planer interface, but make more extreme angles at higher index magnitude.

Fabrication of any of these negative index lenses can be done using periodically structured artificial materials. Artificial material designs can operate at frequencies from megahertz through terahertz, where there are numerous communication and imaging applications. For example, lens antennas could benefit both by a reduction in aberrations, which translates directly into increased gain, and by a reduction of mass, afforded by low density artificial materials. Furthermore, these lenses are even easier to implement than a perfect lens, since they lack its severe structure period per wavelength requirements and are more tolerant to losses. Negative index lenses at visible light frequencies may also be possible, by using photonic crystals, which have shown potential for negative refraction. Using the current optical system design paradigm, aberrations are minimized by combining elements with coefficients of opposite sign. However, more elements mean greater complexity and cost. Taking advantage of an expanded parameter space that includes negative index can reduce the number of required elements, with lenses having only one element believed to be possible.

By way of further illustration, additional exemplary lenses of the invention are described. One exemplary metamaterial lens of the invention is comprised of homogenous isotropic refractive media with two opposing faces defined by co-axial spherical surfaces, such that the thickness of the lens is thin compared to its diameter and the distances to its intended focal points. In the geometric limit, the lens focuses parallel light (light from a very distant or collimated source) to a real image point with zero spherical aberration. To achieve this the shape factor, $$q = \frac{R_2 + R_1}{R_2 - R_1},$$

where $R_1$ and $R_2$ are the radii of curvature of the two lens surfaces, and the refractive index, n, are adjusted such that, $q=[2(n^2-1)\pm n\sqrt{1-4n}]/n+2)$, where n must be less than ¼. This cannot be achieved with traditional materials in an air or vacuum background. Implementation can be realized with metamaterials.

An additional exemplary metamaterial lens is as above but configured for the specific case that n=−1. The lens focuses parallel light to a real image point with zero spherical aberration and zero field curvature aberration.

An additional exemplary metamaterial lens of the invention comprises homogenous isotropic refractive media with two opposing faces defined by co-axial spherical surfaces, such that the thickness of the lens is thin compared to its diameter and the distances to its intended focal points. In the geometric limit, the lens focuses light from a point source at a finite location to a real aplanatic point, that is a point with zero spherical aberration and zero coma aberration. To achieve this the shape factor, q, the position factor, p, (p=1−(2f/S'), where f is the focal length and S' is the distance from the lens to the image), and the refractive index, n, are adjusted such that, $q=\pm 2(n+1)$, and $p=\mp[n+1]/(n-1)]$. We note that real aplanatic images are only possible when n<0. Such a lens an also be configured for the specific case that n=−1. In this case the field curvature aberration is also zero.

An additional exemplary metamaterial lens of the invention comprises a bi-concave doublet lens composed of two plano-concave component lenses contiguously joined on their flat sides. The two component lenses are of equal thickness and have spherical surfaces of equal curvature. The refractive media comprising the component lenses are related by, $n_1=-n_2$. This doublet lens possesses all the properties of the lens above—that is it can focus a real image with zero spherical aberration, zero coma aberration and zero field curvature aberration. Implementation requires n<0, but can be realized with metamaterials.

Although metamaterial lenses have been discussed and illustrated herein having negative indexes, it will be appreciated that positive index lenses made of metamaterials will likewise be useful and beneficial.

C. A Gradient Index Metamaterial

An additional aspect of the present invention is directed to a metamaterial having a gradient index. One embodiment of this aspect of the invention includes a structured metamaterial based on conducting split ring resonators (SRR's), which has an effective index of refraction with a constant spatial gradient. The gradient is experimentally confirmed by measuring the deflection of a microwave beam by a planar slab of the composite metamaterial over a broad range of frequencies. The gradient index metamaterial of the invention represents an alternative approach to the development of gradient index lenses and similar optics that may be advantageous, especially at higher frequencies. In particular, the gradient index material of the invention may be suited for terahertz applications, where the magnetic resonant response of SRRs has recently been demonstrated.

An example of unusual metamaterial response can be found in negative index metamaterials, which possess simultaneously negative permittivity ($\in$) and permeability (μ) over a finite frequency band. The negative index metamaterials thus far demonstrated have been formed from periodic arrays of conducting elements, the size and spacing of which are much less than the wavelengths of interest. The shape of the repeated conducting element determines the electromagnetic response of the collective, which can be approximated as having an electric or a magnetic resonance. Application of effective medium theory to the overall periodically patterned composite allows a description in terms of bulk isotropic or anisotropic $\in$ and μ.

Figure 9:
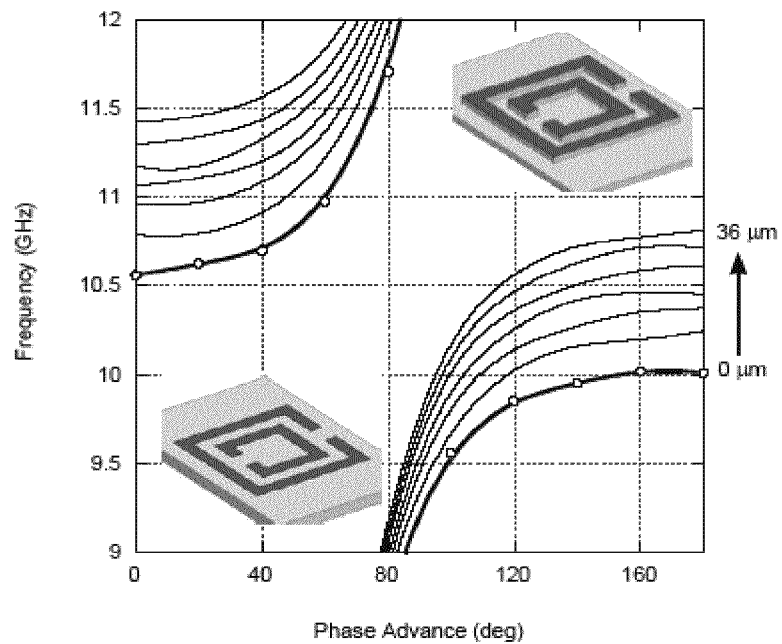
FIG. 9 is useful to illustrate properties of an exemplary metamaterial of the invention.

The split ring resonator (SRR), shown in the insets to FIG. 9, is one exemplary conductor useful as a repeated element in metamaterials that exhibit magnetic properties. A single SRR responds to electromagnetic fields in a manner analogous to a magnetic "atom," exhibiting a resonant magnetic dipolar response. A medium composed of periodically positioned SRRs can be approximately characterized by the following frequency dependent permeability μ:

$$\mu(\omega) = 1 - \frac{F\omega^2}{(\omega^2 - \omega_r^2) + i\omega\gamma}, \quad (1)$$

where $\omega_r$ is a resonant frequency determined by the SRR geometry, γ is the damping and F is the filling factor. The SRR medium also exhibits an effective permittivity, $\in$, which has been shown to also be dispersive as a function of frequency. However, this frequency dependent behavior is minor at frequencies far away from the resonance, and approaches a constant in the limit of small cell size; thus, we approximate here the permittivity as a constant over frequency. In addition, the orientation of the SRR relative to the field polarization used implies that the electric and magnetic responses are decoupled.

FIG. 9 shows simulated dispersion curves for SRRs. The thicker black curve pair (including an upper and lower branch) corresponds to SRRs on a flat substrate (lower inset). The open circles indicate simulated phase advances. Subsequent pairs of curves correspond to cases in which the substrate has been removed around the SRR (upper inset). The depth of cut increases by 6 μm between each set of curves.

In the prior art, metamaterials have been constructed from repeated unit cells containing identical elements, such that the resulting medium can be considered homogeneous in the sense that the averaged electromagnetic response does not vary over the structure. An embodiment of the present invention, on the other hand, includes metamaterials whose averaged electromagnetic properties vary as a function of position. Such spatially dispersive materials are of interest, for example, as they can be utilized in a variety of applications, including lensing and filtering. An embodiment of the present invention is a metamaterial based on SRR's in which a pattern of spatial dispersion is introduced by a slight change in the properties of each successive element along a direction perpendicular to the direction of propagation. The resulting metamaterial has a constant gradient index along this axis of the metamaterial, which can be confirmed by beam deflection experiments.

While an SRR medium is known to have a predominantly magnetic response, this is not of direct interest here; rather, we are concerned with the refractive index n(ω) of the SRR medium, found from $n(\omega)=\sqrt{\in(\omega)\mu(\omega)}$, with μ(ω) given by Eq. 1 and $\in(\omega)$ approximated as constant. This form of the dispersion, ω=ck/n(ω), can be compared with that obtained from a numerical solution of Maxwell's equations for a single unit cell. To obtain the dispersion diagram numerically, we compute the eigen frequencies for a single unit cell (FIG. 9, inset), applying periodic boundary conditions with zero phase advance in directions perpendicular to the propagation direction, and periodic boundary conditions with various phase advances in the propagation direction. The simulations are performed using HFSS (Ansoft), a finite-element based electromagnetic solver. The resulting dispersion diagram, shown as the frequency versus the phase advance φ across a unit cell (black curve), reveals the expected resonant form. Specifically, there are two branches of propagating modes separated by a frequency band gap. The lower branch starts at zero frequency and ends at ωr with a phase advance of 180°. The next branch begins at a frequency $\omega_{exp}=\omega_r/\sqrt{1-F}$ [7]. The propagation constant k can be found from k=φ/d, where d is the size of the unit cell.

The resonant frequency of an SRR, ωr, depends rather sensitively on the geometrical parameters and local dielectric environment for the SRR. Since μ(ω) depends strongly on ωr (Eq. 1), relatively small changes to the basic repeated unit cell can result in substantial changes to the permeability of the composite, especially near the resonance. The change in index $n(\omega)=\sqrt{\in(\omega)\mu(\omega)}$ with change in resonant frequency can be calculated using Eq. 1. For convenience we neglect damping and set $\in(\omega)=1$ as the primary role of the permittivity over the frequency band of interest will be to rescale the dispersion curves. At low frequencies (ω<<ωr) the index changes linearly with small changes in the resonance frequency, or $$\Delta n \sim -\frac{\omega^2}{\omega_r^3}\Delta\omega_r. \quad (2)$$

whereas in the high frequency limit (ω>>ωr), we find $$\Delta n \sim -\frac{\omega_r}{\omega^2}\Delta\omega_r. \quad (3)$$

Assuming Δωr/ωr<<1 and ignoring higher order terms, for the model system described by Eq. 1 the gradient increases as the square of the frequency for ω<<ωr and decreases as the inverse of the square of the frequency for ω>>ωr.

Those knowledgeable in the art will appreciate that there are a variety of modifications to the SRR or its environment that can be used to introduce a variation in ωr. For example, adjustments to the size, amount, spacing or geometry of the conductor arrays or to the dielectric can be made. One exemplary method is to adjust the depth of cut of the dielectric substrate material surrounding the SRR. This method is compatible with exemplary sample fabrication, in which SRRs are patterned on copper clad circuit boards using a numerically controlled micromilling machine. The removal of dielectric material from the region near the SRR ($\in$~3.8 for FR4 circuit board) changes the local dielectric environment of the SRR, effecting a change in the resonance frequency.

In FIG. 9, several dispersion curves correspond to SRR composites for various depths of substrate material around the SRR. The depth of substrate differs by 6 μm between successive dispersion curves. FIG. 9 shows that ωr shifts approximately linearly and monotonically with increasing depth of cut, up to 36 μm in depth. Further simulations show the approximate linearity is valid to 240 μm.

Because the SRR exhibits a resonant frequency ωr that increases linearly as a function of the substrate cut depth, it is a convenient element from which to design a gradient index metamaterial. In particular, a metamaterial of the present invention includes one of a linear array of SRRs in which ωr varies as a function of cell number. For example, if a metamaterial having a substrate cut depth that advances linearly as a function of cell number, ωr will then also advance linearly as a function of cell number; that is, ωr becomes linearly proportional to distance. Using this relationship in Eqs. 2 and 3, we see that the gradient of the index will thus be approximately constant as a function of distance, at least for frequencies far enough away from ωr.

Figure 10:
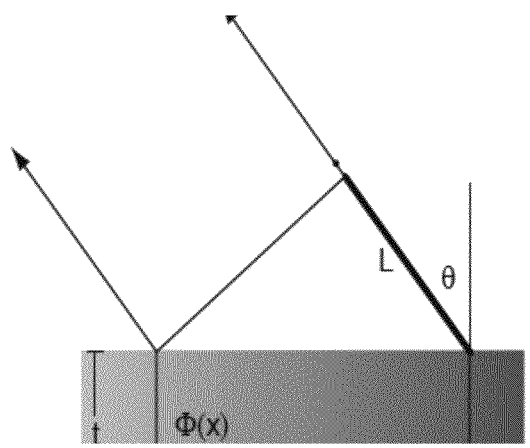
FIG. 10 is useful to illustrate properties of an exemplary metamaterial of the invention.

A constant gradient metamaterial has been experimentally confirmed by observing the deflection of a beam incident on a planar metamaterial slab whose index varies linearly (in a direction perpendicular to incident radiation). To calculate this deflection, we consider two normally incident but offset rays entering a gradient index planar slab of thickness t, as shown in FIG. 10. The diagram of FIG. 10 shows the deflection of a wave by structure whose refractive index possesses a gradient that is constant.

The rays will acquire different phase advances as they propagate through the slab. Assuming the two rays enter at locations x and x+Δx along the slab face, then the acquired phase difference of the two beams traversing the slab, $$\Phi(x+\Delta x)-\Phi(x) \sim kt\frac{dn}{dx}\Delta x, \quad (4)$$

must equal the phase advance across the path length marked L in FIG. 10. We thus have $$\sin(\theta) \sim t\frac{dn}{dx} = t\frac{dn}{d\omega_r}\frac{d\omega_r}{d\delta}\frac{d\delta}{dx}, \quad (5)$$

which shows that for a material with a constant spatial gradient in index, the beam is uniformly deflected. Here, δ(x) is the depth of cut as a function of distance along the slab. This simplified analysis preferably applies to thin samples, as the phase fronts may otherwise not be uniform within the material. Note that Φ(x) is the phase shift across a slab of arbitrary thickness. If the slab is one unit cell in thickness, then for the SRR cell the phase shift will be φ as defined earlier.

An exemplary gradient index metamaterial of the invention includes a dielectric substrate, at least two conductor lattices interspersed with one another and supported by the dielectric substrate. The at least two conductor lattices and dielectric are dimensioned to provide a gradient in effective permeability along at least one axis. As used herein the term "dimensioned" is intended to be broadly interpreted and includes forming components having particular dimensions. For example, dimensioning a dielectric and conductor lattice may include setting the size of the conductors, the spacing between the conductors, the type of dielectric used, the amount of dielectric used, the capacitance of one of the conductors, and the like. It will be understood that although in an exemplary metamaterial a depth of cut of dielectric is used to dimension unit cells to result in a gradient index, other methods of dimensioning can be carried out.

Figure 11:
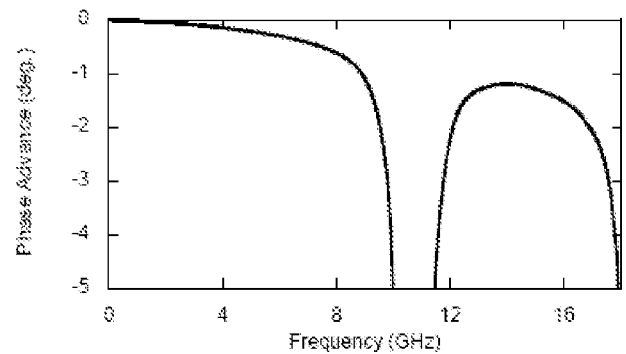
FIG. 11 is useful to illustrate properties of an exemplary metamaterial of the invention.

One exemplary constant gradient index metamaterial includes a linear array of SRR's in which the substrate depth is a linearly increasing function of cell number in the direction perpendicular to the propagation. The resulting array should then deflect an incident beam by an angle that can be predicted by the dispersion diagrams in FIG. 9. To estimate this angle of deflection, we can take the difference between any two of the curves in FIG. 9 to find the gradient of the phase shift per unit cell. The phase shift per unit cell is equivalent to the beam deflection that will be produced by a gradient index metamaterial slab one unit cell thick in the propagation direction. The resulting plot of deflection angle as a function of frequency, obtained from the dispersion curves in FIG. 1, is shown in FIG. 11. FIG. 11 shows frequency versus phase difference per unit cell for the SRR material shown in FIG. 1, in which each successive cell differs by a 6 µm depth of cut.

The curves in FIG. 11 are useful to calculate deflection angles only for frequencies where the gradient is constant, which can be determined, for example, by analyzing the differences between several of the dispersion curves of FIG. 10. Furthermore, near the resonant frequency on the low side, the absorption resonance leads to a region of anomalous dispersion where the simulation results (which do not take into account losses) are not valid. An additional complicating factor is that the analyzed structure is periodic, so that higher order bands exist at frequencies greater than ω that are not described by Eq. 1. Nevertheless, FIG. 11 provides an indication that at frequencies above the band gap, per unit cell phase shifts of one degree or more should be obtainable from an SRR slab, one unit cell in thickness, in which each successive cell has an additional 6 µm of substrate dielectric removed relative to the previous cell.

Figure 12:
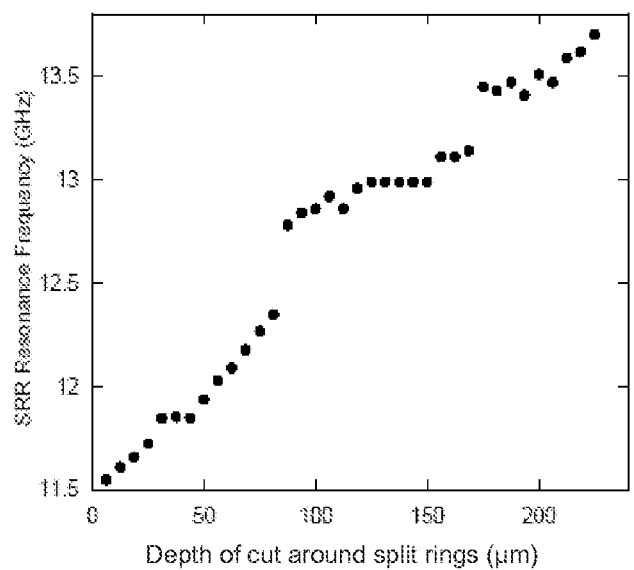
FIG. 12 is useful to illustrate properties of an exemplary metamaterial of the invention.

To fabricate exemplary gradient index metamaterial samples, an LPKF micromilling machine was used to mill varying length strips of SRRs (number of cells) from copper clad (single side) FR4 circuit board substrates. Several samples were fabricated with thicknesses (in the direction of propagation) of 1, 3, or 5 unit cells. The composite metamaterials are composed of roughly forty strips spaced one unit cell apart, each strip having the substrate milled to a different depth. The resonance frequency of each SRR strip is measured in an angular resolved microwave spectrometer (ARMS). The measured resonance frequencies of each strip versus the depth of cut are plotted in FIG. 12, where the linearity of the fabrication process is confirmed. FIG. 12 illustrates resonant frequency versus substrate depth for the machined SRR samples. The nominal difference in substrate thickness between subsequent milling passes was 6 µm. Note that at two depths there are breaks from the linearity; these deviations from linearity coincide with tool bit changes on the milling machine, indicating some lack of reproducibility in repositioning the mill at the nominal zero cut depth position. The resulting linearity, however, proved to be sufficient for the deflection experiment.

The composite gradient index samples are measured in the ARMS apparatus. To confirm the gradient in the sample, a microwave beam was directed normally onto the face of the sample (as in FIG. 10), and the power detected as a function of angle at a radius 40 cm away. The experiment is carried out in a planar waveguide—an effectively two-dimensional geometry in which the electric field is polarized between two conducting (aluminum) plates.

Figure 13:
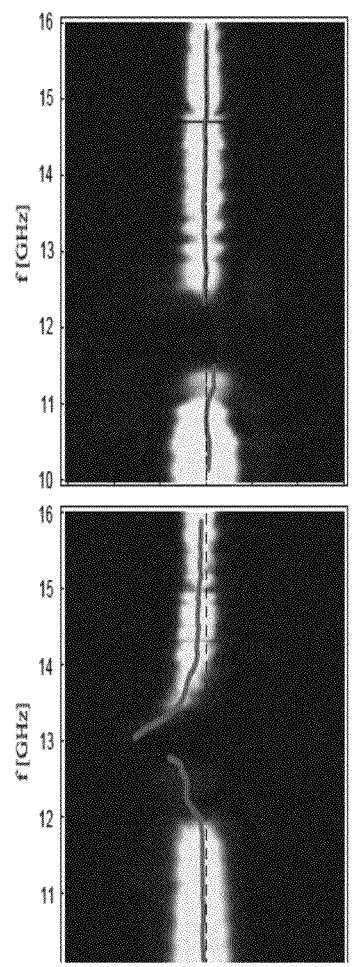
FIG. 13 is useful to illustrate properties of an exemplary metamaterial of the invention.

FIG. 13 presents a map of the transmitted power versus angle of detection, as a function of the frequency of the incident microwave beam. Two samples are compared in the figure: FIG. 13(top) shows a control sample consisting of a five cell deep SRR metamaterial, where each SRR strip is identical (no gradient). The plot in FIG. 13(top) shows transmission at frequencies corresponding to pass bands, and a frequency region of attenuation corresponding to where the permeability is negative. As shown by FIG. 13, the microwave beam exits the sample without deflection, centered about zero degrees.

FIG. 13(bottom) presents results of a measurement on an eight cell thick (in propagation direction) gradient index sample of the invention, formed by combining the three and five cell samples together. The angular deviation is evident in the figure, especially at the high frequency side of the gap region, where a characteristic tail can be seen in agreement with that predicted in FIG. 11. The qualitative aspects of the curve are in agreement with the theory and simulations above, except that there is weaker evidence of deflection on the low frequency side of the gap. This lack of symmetry, however, is expected, as the lower frequency side corresponds to the resonance, where the absorption (neglected in the dispersion diagrams) is strongest.

Figure 14:
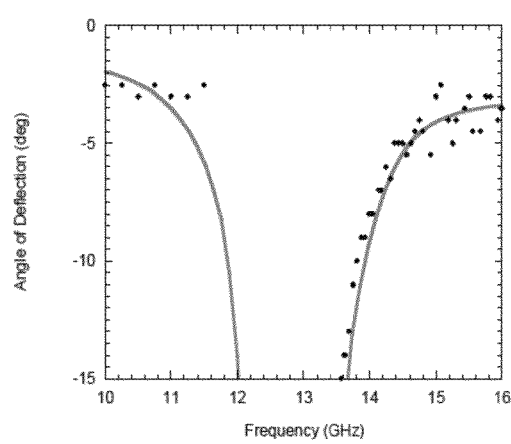
FIG. 14 is useful to illustrate properties of an exemplary metamaterial of the invention.

A detailed comparison of the measured and calculated angle of deflection versus frequency is shown in FIG. 14 for the four and eight cell thick gradient index metamaterials. The curves correspond to the gradient determined from FIG. 11, while the open and black circles are measured points. A frequency translation was applied to the dispersion curve to make the calculated band gap coincident with the band gap measured in the actual structure; no other fitting or adjustments were performed. FIG. 14 shows the measured angle of deflection (black circles) of a gradient index SRR slab, eight unit cells in thickness. The gray curves are taken from those shown in FIG. 11, but have been translated in frequency so that the calculated and the measured band gap regions overlap. The excellent agreement shown in FIG. 14 attests to the precision of the fabrication process, as illustrated in FIG. 12. The agreement also provides important evidence that even a single unit cell can be described as having a well-defined refractive index, since the interpretation of this effect depends on a refractive index that varies controllably from cell-to-cell within the structure.

FIGS. 13 and 14 show the practicality of designed spatially dispersive structures of the invention. In this case, a linear gradient has been introduced that has the effect of uniformly deflecting a beam by an angle adjustable by design. Although other metamaterial configurations may also be used in the invention, including for example, DSRR's, split-circular resonators, and others, it is convenient to work with the SRR system as the properties of SRRs are well established. In particular, the resonance frequency of the SRR is relatively easy to identify, can be easily tuned by slightly modifying the parameters of the unit cell (including, but not limited to, substrate cut depth), and can be used to roughly parameterize the entire frequency dependence of the SRR. While not the only method for introducing a gradient, the gradient index SRR structure shows the feasibility of creating yet another unique type of metamaterial by combining macroscopic elements.

Another embodiment of a gradient metamaterial of the invention includes gradient index lenses. A parabolic (as opposed to linear) distribution of index in the slab along an axis perpendicular to the direction of wave propagation results in a structure that focuses radiation rather than deflecting it. Examples of such gradient index lenses include radial gradient index rod lenses, used at optical frequencies, and Luneberg lenses, used at microwave frequencies.

Gradient index rod lenses use optical glass materials that are ion doped via thermal diffusion. This process can produce only modest variations of the refractive index, (less than 0.2), and is limited to fairly small diameter rods, (less than 1 cm). Luneberg spherical or hemispherical lenses, which require the fairly wide index range of n=1 to n=2, can be implemented as stepped index devices with no particular size limitation. Both devices employ gradients in the dielectric permittivity only, and thus have limited impedance matching to the surrounding media. Gradient index metamaterials may provide a useful alternative approach to the development of optics. With the increased range of material response now identified in metamaterials, including negative refractive index, considerably more flexibility and improved performance from traditional and planar lenses formed from artificially patterned media should be possible. Gradient index metamaterials of the invention that include magnetic permeability gradients, for example, could be used to develop materials whose index varies spatially but which remains matched to free space. Moreover, gradient index metamaterials of the invention are believed to be realizable at higher frequencies including THz.

Metamaterials having a gradient index may prove beneficial in numerous additional applications. A metamaterial of the invention, for example, includes lens formed from a metamaterial having a gradient index. The gradient index may be configured to provide a wide variety of focusing effects. A circular metamaterial having planar surfaces and formed from a plurality of unit cells, for example, can be configured with a first index in a center region and a gradually decreasing (or increasing) index moving outward radially. This can result in a variety of focusing effects from a substantially flat metamaterial. Other geometries, including non-planar surfaces and perimeter shapes other than circular, can likewise be used. Also, a plurality of metamaterials having gradient indexes may be arranged in a stacked configuration with one another to direct rays as desired. Rays could be directed, for example, to pass "around" an object, thereby rendering it substantially "invisible."

D. Fabrication and Characterization of a Negative-Refractive-Index Composite Metamaterial Another aspect of the present invention is directed to composite metamaterials. An exemplary negative index includes 2.7 mm thick composite panels having negative refractive index between 8.4 and 9.2 GHz. The exemplary composite metamaterial is fabricated using conventional commercial multilayer circuit-board lithography; three-dimensional physical (as opposed to electromagnetic) structure is introduced by the use of vias to form sections of the scattering elements in the direction perpendicular to the circuit board surfaces. From scattering parameter measurements, the complex permittivity, permeability, index, and impedance of the composite is unambiguously determined. The measurements enable the quantitative determination of the negative index band and associated losses. The extracted material parameters are shown to be in excellent agreement with simulation results.

Prior art metamaterials have been constructed and used to demonstrate experimentally negative refraction at microwave frequencies. This material made use of an array of dual split-ring resonators (SRRs) that provided a negative $\mu$, interspersed with an array of wires that provided a negative $\in$. Because the region of negative $\in$ overlapped the region of negative $\mu$ associated with the SRR's, the composite had a frequency band of negative index. In this material, the SRR's and wires were patterned by optical lithography on either side of a circuit board substrate. The SRR/wire structures have proven difficult to fabricate. For example, the SRR elements impose a specific burden on fabrication that adds a layer of complexity to current negative index metamaterial designs. Unlike straight wires, the SRR elements typically require a significant length in the direction of wave propagation in order to provide a strong magnetic response. To meet this constraint, previous circuit-board based SRR designs have required sectioning a planar SRR circuit board into strips, or using sheets of the planar circuit boards, oriented so that the incident wave direction is in the plane and the SRR axes lie perpendicular to the propagation direction of the incident wave.

One exemplary metamaterial of the present invention utilizes multilayer circuit board techniques to fabricate a negative index metamaterial structure as shown by FIGS. 15(a) and (b) that requires no additional assembly step. The exemplary design of the invention departs from the need for a "wine-crate" assembly step inherent to previous metamaterials, and is well suited for mass production. In one exemplary design, single SRR's are used rather than dual SRR's to achieve negative $\mu$. In prior art metamaterial structures, nested dual SRRs were utilized as a convenient means of increasing the capacitance of the resonator element; here, the combination of the diameter of the via pads and the higher dielectric constant of the intervening layer introduces sufficient capacitance such that the additional capacitance of the second ring is not necessary.

One exemplary composite metamaterial is assembled from three laminated dielectric layers 50, 52 and 54. The top 50 and bottom 54 layers consist of Rogers 4003 circuit board laminates ($\in$=3.38, tan d=0.003), with a prepreg layer 52 of Gore Speed Board ($\in$=2.56, tan d=0.004) sandwiched therebetween. An exemplary layer 52 is a 0.0015" thick layer of Gore Speedboard. The total thickness of the structure (layers 50, 52, and 54) is therefore about 0.065 in. Further exemplary dimensions are indicated in Table I. The layers are bound laminated together, for example using an adhesive at the interfaces between the Gore and Rogers circuit.

TABLE I

Measured and simulated parameters of the negative index composite structure in millimeters.

| Dimension | Measurement | Simulated |
|---|---|---|
| Unit cell | | |
| X | 3.01 ± 0.01 | 3.00 |
| Y | 3.01 ± 0.01 | 3.00 |
| Z | 2.62 ± 0.01 | 2.616 |
| Through via | | |
| Outer radius | 0.131 ± 0.006 | 0.130 5813 |
| Inner radius | 0.090 ± 0.009 | 0.089 6786 |
| Height | 2.41 ± 0.05 | 2.424 5 |
| Blind via | | |
| Height | 1.07 ± 0.03 | 1.052 376 |
| Laminate thickness | | |
| Gore | 0.078 ± 0.003 | 0.077 831 |
| Rogers 4003 | 0.92 ± 0.03 | 0.894 081 |
| SRR dimensions | | |
| Via-via distance | 2.51 ± 0.02 | 2.512 1047 |
| Gap | 0.320 ± 0.006 | 0.319 7473 |
| Outer layer, thickness | 0.094 ± 0.009 | 0.093 967 |
| Outer layers, width | 0.176 ± 0.009 | 0.176 1885 |
| Outer layers, length | 2.90 ± 0.06 | 2.899 336 |
| Wire dimensions | | |
| Thickness | 0.0249 ± 0.0004 | 0.0249 06 |
| Width | 0.500 ± 0.005 | 0.50 |

Both of the Rogers circuit boards 50, 54 initially have a thin conductor layers of copper (half-ounce, or, 12 μm in thickness) deposited on both sides from which the elements are patterned using conventional optical lithography. The wire elements are patterned as strips 56 on the sides of the Rogers boards that face the Gore SpeedBoard, as shown in FIG. 15(a). The particular dual wire geometry used was chosen so that the structure would maintain reflection symmetry in the direction of wave propagation. Other geometries will be useful within the invention. Symmetric structures are convenient when performing the retrieval of the material parameters from the scattering (S-) parameters, described below. A single wire, for example, placed in the center of the structure would give nearly identical results, but such a placement is not practical in the current multilayer design.

Two sides of the nominally rectangular SRR element are patterned on the outside faces of the Rogers circuit board with thin conductor strips 58 made of copper. The remaining two perpendicular sides or legs of the conductor are formed from vias—plated through holes—that extend through laminate layers 50, 52 and 54 of the circuit board. One side 60 is formed by a through via extending continuously through all three layers of circuit board. The last side of the SRR is formed by two blind vias 62 and 64, that each terminates at respective sides of the center laminate layer 54 at circular plates 66. The dielectric layer 54 defines a gap between the plates 66. Additional dielectric layers 68 may be provided to cover the uppermost and lowermost surfaces of the laminate. Small annular rings introduce the capacitive gap. FIG. 15(*b*) is an image of an exemplary manufactured composite that includes multiple of the individual cells of FIG. 15(*a*) arranged in an array. The patterned copper stripes shown are one side of the embedded ring resonator. A side view of the resulting SRR is shown in FIG. 15(*c*).

It will be appreciated that many equivalent structures will be possible within practice of the invention in addition to that illustrated by FIGS. 15(*a*)-15(*c*). Other geometries and configurations are possible. For example, conductor ring resonators can be formed on the top surface of layer 50 and the bottom surface of layer 52, with substantially straight conductors in vias between the top and bottom surfaces at a normal to the conductor rings. Or, substantially straight vias may be placed on the middle layer 52. By way of additional example, a conductor ring resonator may be formed on the middle layer, and straight conductors formed on the surfaces of layers 50 and 54. Still further, conductors other than single ring resonators may be used.

Many other particular embodiments are possible. Indeed, those knowledgeable in the art will appreciate that one of the important advantages of the component metamaterials of the invention, with an example being that of FIGS. 15(*a*)-15(*c*), relates to the flexibility of fabrication that is possible using commercial circuit board fabrication methods. This flexibility leads to an wide variety of different conductor and dielectric configurations that can be efficiently accomplished using circuit board dielectrics.

Still further, the embodiment of FIGS. 15(*a*)-15(*c*) lends itself to modification to provide varied permittivity or permeability between unit cells. In this manner, metamaterials having a gradient index can be formed. By altering the dimensions of some metamaterial unit cells (such as that illustrated by FIGS. 15(*a*)-15(*c*)) and combining these with other unit cells to form a metamaterial, a metamaterial having a gradient index can be formed. FIG. 16 illustrates one suitable exemplary embodiment that has been dimension through removal of dielectric to alter its capacitance. Using holes in the interior laminate layer 52 to create air gap capacitors may be useful, for example, to reduce dielectric losses. The air gap cavities can also be formed by skiving using a CNC laser ablation tool (such as the Microline Cut 350, LPKF) after lamination of the interior to one side.

Further dimensioning to a unit cell such as that of FIGS. 15(*a*)-15(*c*) can be made to vary the permittivity or permeability. By way of example, one exemplary dimension that can be changed is the size of the plates 68. Other exemplary dimensions that can be varied include the distance between the plates 68 and the conductors 56, the size of the conductors 56, the amount of dielectric, the thickness of the layer 52, and the like. It will be appreciated that if other conductor configurations are used, other dimensioning can be performed to change permittivity. These are all dimensions which lend themselves well to commercial fabrication methods using lithographic, MEM, or circuit board fabrication methods.

Using the driven solution in (HFSS) (Ansoft), a finite element based software package that solves Maxwell's equations, the S-parameters were simulated for variations of the unit cell shown in FIGS. 15(*a*)-15(*c*), and the material parameters retrieved by standard methods. Through this analysis, a suitable structure was found that provided a nearly matched negative index band over x-band frequencies. The optimized structure was then fabricated. Before performing scattering measurements on the sample, detailed physical measurements were performed so that the best comparison with numerical simulations could be obtained. Several cuts in different planes were made in one of the sample sheets. Each of the resulting faces was then polished and photographed under a microscope. The dimensions of each of the critical elements in the structure were determined by counting pixels in the corresponding digital image. Calibration was achieved using a hardness test divot whose length was known to 0.1 mm. The physical measurements, summarized in Table I, were then used in the comparison simulations shown below.

To confirm the expected properties of the negative index composite, the magnitude and phase of the S-parameters (S11 and S21) were measured. The experiments were performed in free space. In the experiment, an Agilent 8510B vector network analyzer was used to sweep microwaves over a frequency range 7-13 GHz. Two microwave horns (Rozendal Associates Inc., Santee, Calif.) were used as the source and detector. Lens assemblies mounted on the horns produced a focused spot at a distance of approximately 30.5 cm (12 in.). The sample was placed at the focus. For transmission experiments, a confocal setup was used, in which both the source and detector horns were placed one focal length from the sample. Calibration was performed using a "through" measurement, in which the transmitted power was measured in the absence of any material. For the reflection measurement, the horns were moved to the same side of the sample. Because of the finite size of the horn/lens assemblies, the two horns were offset from each other such that the power was incident at an angle of 16° from the surface normal of the sample. The reflection was calibrated by measuring the reflected power from an aluminum plate—assumed a perfect reflector (with a 180° phase shift) for this measurement.

Figure 17:
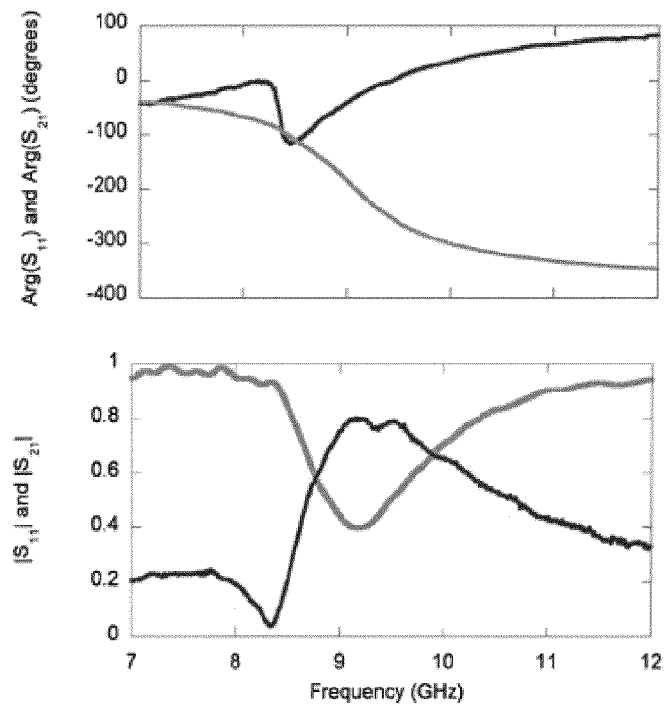
FIG. 17 is useful to illustrate properties of an exemplary metamaterial of the invention.

The magnitude and phase of the S-parameters for a single layer of the negative index composite are presented in FIG. 17. That figure shows S-parameters for a single layer of the negative index composite: Phase of $S_{21}$ (black curve) and $S_{11}$ (gray curve).

A method of demonstrating negative index in past work has been to first measure the transmitted power through a sample of SRRs alone, identifying the frequency range of the stop band where $\mu<0$; then measure the power transmitted through a wire structure alone; and finally measure the power transmitted through the composite structure. This method is convenient when phase data is not available and when the frequency of negative index forms a well-defined pass band. As can be seen from FIG. 17, however, there are no readily identifiable features from the single layer transmitted power FIG. 17 (bottom) that clearly indicate negative index. However, the noise level of the measured phase data FIG. 17 (top) is quite low, implying that the full S-parameters retrieval procedure should provide stable results.

The full retrieval of the material parameters for a metamaterial proceeds by a measurement of the transmitted and reflected amplitudes and phases from a slab of finite thickness. For continuous, isotropic materials, the transmission and reflection coefficients have analytic forms that can be readily inverted. For example, the inversion of the scattering equations leads to the following form that allows determination of the refractive index:

$$\cos(nkd) = Re\left(\frac{1}{S_{21}}\right) - \frac{1}{2|S_{21}|^2}(A_1 S_{11} + A_2 S_{21}), \quad (1)$$

where $A_1$ and $A_2$ are real valued functions that tend to zero in the absence of losses. Equation (1) shows that, for a lossless sample, the index can be determined from just the phase and amplitude of $S_{21}$. Furthermore, for roughly matched samples, Eq. (1) indicates a strong correlation between the phase of S21 and the index. The dip in the phase of $S_{21}$, shown in FIG. 17(top), is thus an indicator that the exemplary sample of the invention possesses a negative refractive index somewhere over the frequency region between 8-9 GHz. Having all components available from our measurements however, we need not rely on this approximation but can recover exact functions for the complex index, as well as the complex impedance, which is given by the following:

$$z = \pm \sqrt{\frac{(1+S_{11})^2 - S_{21}^2}{(1-S_{11})^2 - S_{21}^2}}. \quad (2)$$

A retrieval procedure to determine the impedance (z) and the index (n) was carried out on both the measured S-parameter data as well as the S-parameters simulated in HFSS. Although the retrieval of n is generally complicated by multiple branches due to the arccosine function in Eq. (1), the branches are sufficiently separated for the thin sample measured (one unit cell in thickness) that no sophisticated retrieval algorithm was necessary. There is, however, a sign ambiguity in n and z that can be eliminated by imposing that Re(z)>0, and Im(n)>0 and Im(n)>0—requirements necessary for a causal material. No other manipulation was performed on the data, other than to apply a 31 point smoothing on the measured S-parameter data to reduce the impact of voltage standing-wave ratio (VSWR) resonances inherent to the setup. Note that Eqs. (1) and (2) neglect any possible effects due to chirality or bianisotropy. Negative index composites of the invention were designed so as to eliminate or at least minimize any magneto dielectric coupling, so that these simple formulas would be approximately valid for the retrieval procedure.

Figure 18:
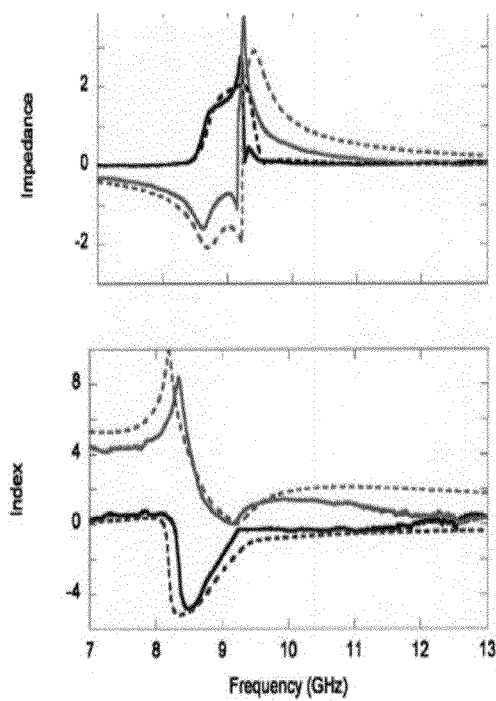
FIG. 18 is useful to illustrate properties of an exemplary metamaterial of the invention.

The retrieved z and n are shown in FIGS. 18(top) and 18(bottom), respectively. FIG. 18(top) shows recovered impedance (z) from simulation data (dashed curves) and from measured S-parameters (solid curves) for one unit cell of the structure. FIG. 18(bottom) shows recovered refractive index (n) from simulation data (dashed curves) and from measured S-parameters (solid curves). Black curves are the real parts; gray curves are the imaginary parts.

A negative index frequency band occurs in the measured sample between 8.4 and 9.2 GHz. The agreement between the simulated and measured data over the negative index region is excellent, both quantitatively and qualitatively. Any existing disagreement between the four sets of curves could be further minimized by making slight alterations to the material parameters, for example, adjusting the conductivity used for the copper elements. Some of the disagreement might be caused by the non-normal incidence used in the $S_{11}$ measurement.

The permittivity ($\in$) and the permeability (μ) are simply related to n and z according to $\in$=n/z and μ=nz. The retrieved frequency dependent $\in$ and μ are presented in FIG. 19, having been obtained from the values of n and z plotted in FIG. 18.

FIG. 19(top) shows recovered permittivity ($\in$) from simulation data (dashed curves) and from measurement data (solid curves) for one unit cell of the structure. FIG. 19(bottom) shows recovered permeability (μ) from simulation data (dashed curves) and from measurement data (solid curves). Black curves are the real parts; gray curves are the imaginary parts.

The real part of $\in$ exhibits a zero, below which it is negative. Also, μ of the composite exhibits a characteristic resonant form, due primarily to the response of the SRR's, which has a region where the real part of μ is negative. The frequency band where both real parts of $\in$ and μ are negative is consistent with the negative index band found in FIG. 18 (bottom).

In summary, one exemplary aspect of the present invention is directed to a composite metamaterial that possesses a frequency band over which the refractive index is negative. An exemplary structure has numerous advantages and benefits, including, for example, in terms of fabrication since it can be entirely assembled using conventional multilayer circuit board technology that obviates the need for cutting and further assembly steps. The exemplary structure is amenable to numerical simulations which show excellent agreement with the measured structures.

A full S-parameters retrieval provides complete information on the material parameters of an exemplary sample in a direct manner. While indirect methods, such as Snell's law measurements, can provide important complementary information, the S-parameters measurement and retrieval can form the basis of a semi-automated metamaterial characterization procedure.

E. Additional Metamaterial Embodiments of the Invention

Metamaterials have become of great interest, in the context of surface plasmon optics, in the context of negative index metamaterials, as well in other contexts. In negative index metamaterials, however, the negative response has associated with it inherent limitations. The frequency region near the resonant frequency displays increased absorption, where the imaginary part of either $\in$ or μ (depending on which is resonant) becomes relatively large. This behavior is both consistent with and inherent to resonance behavior, and ultimately places key restrictions on negative materials. For passive negative materials:

1. Negative material response is associated with material resonances.
2. Negative materials will be dispersive with frequency.
3. Negative materials will have finite bandwidth.
4. Negative materials will exhibit generally larger losses.

It must be stressed that for passive materials, causality, which leads to the Drude-Lorentz forms, implies the above statements. To pursue the physics of negative materials and to develop competitive applications using negative materials, the present invention includes engineered materials that minimize one or more of these fundamental constraints.

An alternative way of understanding these limitations is in terms of the stored energy density. The familiar expression for the field energy density in a material is $$\langle U_{medium} \rangle = \frac{1}{2}\varepsilon E^2 + \frac{1}{2}\mu H^2$$

However, this expression, arrived at by averaging the Poynting vector over time, is not valid in the presence of a dispersive material, as the $\in$ and μ become nonlocal in time.

Because there is inertia associated with the oscillating charges within the material, the large positive or negative material response that follows readily in the frequency domain comes at an expense: In the time domain, there is a substantial delay until the steady state (monochromatic) solution is achieved. As much of the physics associated with negative materials depends on solutions found in the frequency domain, these dynamics are of critical importance in determining how feasible the steady state solutions will be.

When the details of the Drude-Lorentz medium are taken into account, a more general expression for the energy density of a dispersive medium can be found as follows:

$$\langle U_{medium} \rangle = \frac{1}{2} \frac{d(\omega \varepsilon)}{d\omega} E^2 + \frac{1}{2} \frac{d(\omega \mu)}{d\omega} H^2$$

This expression is valid where the damping is relatively small. The expression shows that $\in$ or $\mu$ may be negative at a given frequency, but must be frequency dispersive such that a positive energy density is maintained.

Materials with either $\in$ or $\mu$ negative are known. In naturally occurring materials, the resonances that give rise to the Drude-Lorentz forms occur within generally restricted frequency ranges. Electric resonances, for example, tend to occur in the high THz frequencies or higher, and result from phonon modes, plasma-like oscillations of the conduction electrons, or other fundamental processes. Magnetic resonances generally occur in inherently magnetic materials, associated with such processes as ferromagnetic or antiferromagnetic resonance. These resonances tend to die out in the higher GHz frequencies, and are absent in all but a few specialized systems at THz frequencies.

Metamaterials can be designed that have either electric or magnetic resonances where there are no equivalent existing materials. Electric and magnetic resonances can be situated at any frequency, up to THz frequencies, in metamaterial structures. In particular, by combining electric and magnetic structures, it is possible to arrive at a material with a frequency band over which both $\in$ and $\mu$ are simultaneously negative. The refractive index, n, for such a material, determined by taking the square root of the product $\in\mu$, is real, indicating the material is transparent to radiation. However, it has been shown that the correct choice for the sign of the square root is negative when both $\in$ and $\mu$ are negative. Thus, materials for which $\in$ and $\mu$ are both negative can be also characterized as negative index materials (NIMs).

NIMs are of interest because, among other reasons, they allow previously unavailable solutions of Maxwell's equations. As such, NIMs represent a striking example of the utility of metamaterials. Yet, although remarkable physical phenomena have been predicted for NIMs, the fundamental limitations of negative materials must be kept in mind. For example, it has been suggested that a surface with $\in=\mu=-1$ can be reflectionless. This statement, however, may be limited to a steady-state condition; if a wave front from free space impinges on such a surface, reflections associated with transients may occur until the steady state solution is reached.

The effort over the past several years has proven that negative index metamaterials can be designed, fabricated and characterized. Negative refraction in steady state experiments has been demonstrated. The collection of initial work has placed negative refractive index on solid ground: We are now in a position to move forward and further develop the materials and methods that will make these novel materials useful. Exemplary embodiments of the present invention are directed to novel and useful metamaterials. Although several embodiments are directed to negative index metamaterials, they may likewise find utility in the form of positive index metamaterials.

E(1). Dual Polarization NIM Development

As yet, there has been no demonstration of a material with negative index for waves having arbitrary incident polarization. The present invention includes such a metamaterial, with an exemplary embodiment illustrated in FIG. 20. Fabrication of such an exemplary structure requires the unit cell to contain an additional magnetic loop oriented perpendicular to the first, as well as an additional wire element aligned with the second electric polarization direction.

The exemplary metamaterial illustrated in FIG. 20 is a dual polarization NIM design using a four layer (Cu) PCB fabrication technique. The rectangular shaped conductors in an intersecting cross pattern are SRR's with two capacitive gaps for each polarization. The negative permittivity is provided by the orthogonal crossing straight wires which give 2D isotropic behavior. The 45 degree rotation minimizes coupling between the elements, and the parallel layer approach allows use of the same layer of Cu forming the capacitor plates without introducing bianisotropy or like complications.

The exemplary design shown in FIG. 20 will exhibit a negative index of refraction for both polarizations of the incident electromagnetic wave. This design contains additional elements within the cell design but introduces no additional challenges in fabrication.

E(2) Component-Based NIM Structures

To achieve the magnetic response associated with NIM's, the underlying unit cell contains a resonant circuit element that couples to the magnetic field component of the incident EM wave. While in typical prior art a double split ring resonator (DSRR) has been employed to provide the magnetic response, a single ring resonator, properly designed, can achieve an equivalent magnetic response, and is easier from a fabrication point-of-view.

The present invention extends the functionality of existing NIMs in the microwave frequency range by embedding miniaturized packaged electronic components within the unit cell. This step allows greater design flexibility, by concentrating a critical element of the electrical performance within a single modular package that can be changed, upgraded or modified as needed. The basic SRR has the simplified equivalent circuit shown in FIG. 21(a). This is a basic LC resonant circuit with a resonant frequency given by $\omega_0 = 1/\sqrt{L_s C_s}$. The current in this circuit is driven by the induced electromagnetic force that results from the time varying magnetic flux through the circuit. The series resistance $R_s$ results from the resistivity of the metal used in fabrication of the unit cell; due to the small skin depth, $R_s$ is strongly dependent on the surface condition.

For structures including (but not limited to) low frequency structures, rather than setting the capacitance in the SRR circuit by means of geometry it has been discovered that a (standard) packaged capacitor can be substituted. The resonant frequency of the SRR can thus be set by the chosen capacitor value. However, using packaged capacitors or other components pushes the limitations of the simplified circuit presented. Other factors become important: dielectric losses due the loss tangent in regions of high electric fields, such as the capacitor dielectric material, or additional parasitic inductance or resistance of the capacitor itself. These additional effects must be included in the modeling of such elements, which alter the circuit as indicated in FIG. 21(b). Because of the parasitic elements, the complete impedance of a packaged capacitor has the form $$Z_{cap} = R_p + j\left(\omega L_p - \frac{1}{\omega C_s}\right).$$

The resonant form of the impedance indicates that the packaged capacitor, itself, will have a resonant frequency. This self-resonance due to parasitic inductance can limit the frequency range over which packaged components can be utilized. Moreover, the reactance of the capacitance and that of the parasitic inductance cannot be separated by a single measurement of the resonant frequency; instead, the high frequency behavior as the inductive contribution dominates is needed to determine the relative contributions. Yet, the current on resonance will depend on these relative contributions, and as the losses may depend strongly on the current, this can be critical in the performance of the NIM.

FIG. 22 schematically illustrates the concept of embedding commercial components. A single layer capacitor, proposed here to be the Vishay HPC0201a series RF silicon capacitor in a 0201 SMT package, is used to provide the needed capacitance. As shown, two capacitors per ring are used; the total capacitance is obtained by the usual series summing rule.

The choice of capacitor to use is dependant on several considerations. The dielectric loss, represented by the loss tangent $\delta$ is important. The lowest dielectric losses are exhibited by air gap dielectric, although construction of such structures is usually difficult, and the relatively low dielectric constant of free space makes higher capacitance difficult to achieve.

The parasitic inductance of most conventional capacitor constructions results in low self-resonant frequencies, making these type capacitors useless for the present application. This is a problem with many embedded capacitor approaches as well, where capacitors are achieved during the layup of circuit boards using specialized processes and materials. The control of dimensions and restrictions on the dielectric materials usually results in poor performance of high speed capacitors, with losses and uncontrolled inductance contributing to the difficulties.

Fortunately, recent developments of single layer capacitors (SLC) offer an attractive alternative. These are lithographically produced with a high degree of control of the dimensions, and using the latest dielectric materials design specifically for capacitor applications. The simple construction allows very low parasitic inductance, and these capacitors are now commercially available with rated self resonant frequency well above 10 GHz.

Existing numerical simulation techniques will not readily be able to characterize and predict the behavior of such structures owing to the complexity and the small dimensions. Further, capacitors are normally characterized by their DC values, and not by their high frequency characteristics. The present invention includes a hybrid approach to analyze the exemplary structures, combining more traditional electrical engineering characterization of components in terms of complex impedance with the established full-wave solutions of negative index materials in terms of full free space S-parameters. By carefully modeling simple structures in HFSS or MWS, such as the SLC, and verifying the expected frequency dependence of the inductive/capacitive reactances, we establish rules which will enable efficient design of structures with active components. This hybrid modeling connects with use of active components, where the influence of parasitic elements should be considered in addition to the nonlinear component.

E(3) Circuit Board Based 3-D NIM's

An additional aspect of the present invention is directed to a circuit board based metamaterial. Exemplary embodiments include a modular metamaterial made of a plurality of individual circuit board pieces that may be fit together. Each circuit board portion includes a plurality of unit cells, with each unit cell comprising a substantially planar circuit boards of a dielectric substrate supporting interspersed arrays of conductors. The cells may include a central gap. The planar circuit boards are arranged in a three dimensions perpendicular to one another and once assembled form a three-dimensional array.

FIG. 23 is a three dimensional schematic of an exemplary NIM of the invention utilizing machined circuit board techniques. FIG. 23(a) shows a dielectric base board 100 that includes a plurality of identical cells. Each cell has an opposing pair of conductors 102 arranged about a substantially square central passage 104. Opposing conductors 102 may be copper strips in a general U shape as shown. A second conductor array 106, which may also be formed of copper, is supported on the base board 100 and has a general grid configuration. The baseboard 100 further includes female connector sockets 108. Each of the conductors 102 and 106 may be copper strips or other conducting material that has been deposited or otherwise placed on the dielectric board 100. The conductors 102 and 106 are preferably upon both opposing sides of the board 100.

Figure 23A:
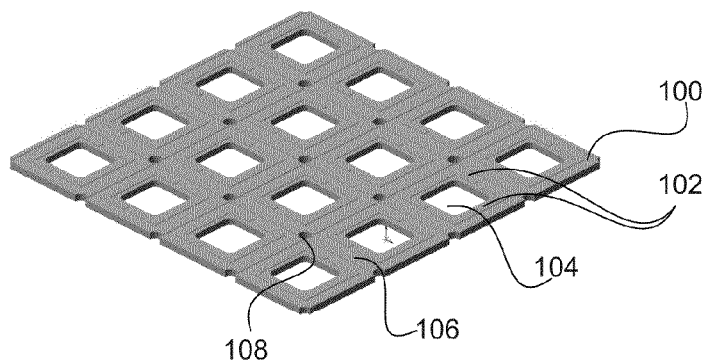
FIGS. 23(a)-23(e) illustrate an exemplary modular etamaterial of the exemplary invention.
Figure 23B:
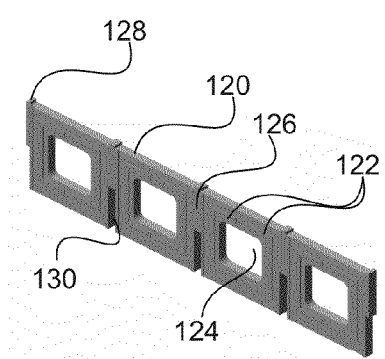

FIG. 23(b) shows a single dielectric strip board 120 that includes a plurality of identical cells. Each cell has opposing conductors 122, that may be U-shaped copper strips, surrounding a substantially square passage 124. Second conductors 126 which may likewise be copper strips are between each unit cell, and extend upward to form a male connector pin 128 configured to mate with the female socket 108. A slot 130 is likewise defined between each unit cell. As illustrated, the slot 130 is preferably at least partially defined by the conductor 126 with the conductor 126 lining opposing sides of the slot 130. Each of the conductors 122 and 126 may be copper strips or other conducting material that has been deposited or otherwise placed on the dielectric board 120. The conductors 122 and 126 are preferably upon both opposing sides of the board 120.

Figure 23C:
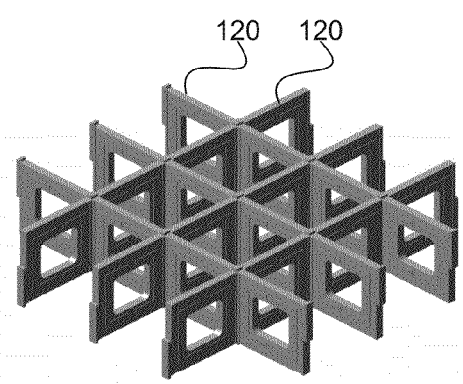
Figure 23D:
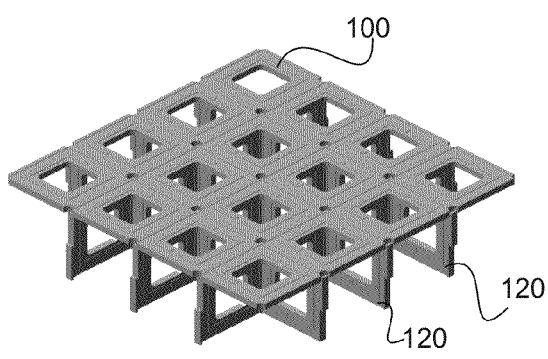
Figure 23E:
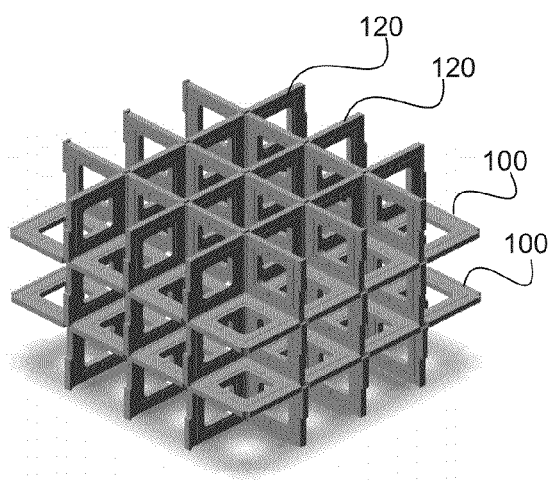

A plurality of strip boards 120 may be fit together to form a three-dimensional grid-like array as illustrated in FIG. 23(c). Each strip board 120 mates with others through interaction of the slots 130 when one inverted strip board 120 engages a second while arranged perpendicular thereto. The grid-like array of FIT FIG. 23(c) may then be engaged with a baseboard 100 through engagement of the male pins 128 with the female sockets 108. The structure of FIG. 23(d) results. By stacking a plurality of these on one another, a three dimensional metamaterial as shown in FIG. 23(d) can be built.

The arrays 106 and 126 are in conductive communication with one another through engagement of the pins 128 with the sockets 128. Further, the arrays 126 are in communication with arrays 126 on other of the strip boards 120 through cooperating engagement of the slots 130. Electrical connections between elements throughout the structure are formed by reflow soldering techniques.

It will be appreciated that the exemplary modular circuit board construction of the invention, with that of FIG. 23 being an example, provides numerous benefits and advantages, including, for example, those related to ease and cost of fabrication. It will likewise be appreciated that the exemplary modular metamaterial of FIG. 23 is one example only, and that many additional embodiments of modular circuit board based metamaterials of the invention are possible. Many of these embodiments have in common that they can be fabricated from generally planar circuit boards that have connectors for mechanically connecting them to one another and for electrically connecting at least one continuous electrical conductor lattice.

E(4) Control of Losses in the NIM Unit Cell through Optimization of Current-Voltage Ratio Losses within the NIM occur due to both conductive losses associated with the conductors (usually copper) and the loss tangent of any dielectric material that experiences electric fields. In the simple picture of the ring resonator presented previously, the resonant current of the LC circuit is $$i = EMF/(Z_R + Z_L + Z_C) = EMF/R + j\left(\frac{1}{\omega L} - \frac{1}{\omega C}\right)$$

One aspect of the present invention is directed to methods and structures that control NIM losses by recognizing that the resonant frequency is set by the LC product, and that a degree of freedom exists in choosing the inductive/capacitive combination. This choice will allow one to vary the relative contributions of the dielectric or ohmic loss channels. It is important to recognize that the inductance is not simply the contribution of the size of loop formed by the SRR; it is also set by the dimensions and geometry of the wires used to form that circuit (e.g., the self-inductance of the wires), and where other packaged or non-packaged components are use, the parasitic inductance of those.

By varying the inductive/capacitive ratio, losses are minimized by altering the relative magnitudes of the induced currents (leading to ohmic losses) to the induced voltages (leading to dielectric losses). That is, the resonant circuit which normally oscillates between energy stored in the electric field ($CV^2/2$) and the magnetic field ($LI^2/2$), can alter the V/I ratio by varying the L/C ratio. There may be practical limits to this—there is a minimum induction and capacitance set by the SRR which must couple to the propagating EM mode. If either loss mechanism can be reduced, then a net lower loss benefit can be realized. The use of lower loss dielectrics, include air, is one avenue to reduce losses. Shown in FIG. 15(c), for example, is a modification of the previously discussed circuit board NIM structure where an air gap is used to eliminate losses associated with the laminate material used in the construction.

E(5) Metamaterials Useful for THz Frequencies

Metamaterials utilized in the prior art at microwave frequencies include dual split ring resonator (DSRR), with four DSRR's shown schematically in FIG. 24(a). The single split ring resonator (SRR), with four shown schematically in FIG. 24(b), is an additional useful resonator. An additional resonator configuration believed to be of use at high frequencies, including THz is shown in FIG. 24(c). The DSRR and SRR of FIGS. 23(a) and (b), in addition to other structures, are likewise believed to be useful at high frequencies, including THz. Still another ring resonator—a C-shaped ring resonatator—is shown in FIG. 23(d). Dual C-shaped ring resonators are also possible. All of the resonators of FIG. 23 may be used in exemplary metamaterial embodiments of the invention. They may also be combined with additional conductors, such as a lattice of straight wire conductors.

In FIG. 24, G is the gap between the inner and outer ring, W is the width of the metal lines, L is the length of the outer ring, S is the separation between adjacent cells, and T is the split of rings. Referring now to the L-shaped resonators (LSRRs) of FIG. 24(c), each individual unit cell includes four L-shaped conductors 200 arranged in an "overlapping square" configuration as shown. One leg of each of the L-shaped conductors 200 is proximate to, and generally coextensive and parallel with, one leg of another of the L-shaped conductors 200. A gap is defined between each of the conductors 200. The conductors 200 form their capacitance from the overlap area of conductors 200. Theoretical and preliminary experimental studies suggest that LSRs possess a higher resonance frequency than that of DSRRs structures for same size of unit cells. This design can ease the fabrication for the same designed frequency since the required critical dimension can be larger.

Metamaterials of the invention include the structure(s) of FIG. 24 combined with an additional structures supported on a dielectric substrate to achieve a THz metamaterial. One example is a thin-wire structure—a periodic lattice of wires—known to have a negative permittivity below a cut-off frequency set by the lattice parameter. Combining the wire structure with an SRR structure has been the method utilized at low frequencies to achieve a NIM. The THz NIM structure may require the fabrication of rather intricate structures with micron scale resolution. For this fabrication, the present invention provides a unique process based on a micro-electro-mechanical-system (MEMS).

An exemplary method of the invention includes the steps of forming a sacrificial layer on a first dielectric substrate, forming a mold in the sacrificial layer, and depositing a conductor in the mold to form a conductor ring such as a SRR, DSR, LRR, or the like. The sacrificial layer is then removed whereby the conductor ring is supported on a surface of said the dielectric substrate. A second dielectric layer is formed covering on the surface of the first dielectric substrate and covering the conductor ring. A second sacrificial layer is formed on the second dielectric layer, and a second mold formed in the second sacrificial layer. A second conductor is deposited in the second mold, and the second sacrificial layer is removed wherein the second conductor is supported on the second dielectric layer over the conductor ring.

A plurality of conductor resonator rings may be formed in this manner, or these steps may be used to form a single unit cell with a plurality of the cells subsequently being combined together. The first and second dielectric layers, the conductor ring and the second conductor thus form a negative index medium having a simultaneous negative permittivity and permeability over a frequency band. Those knowledgeable in the art will appreciate that these steps may be practiced with a variety of different dielectrics, conductors, sacrificial layers, dimensions, and the like. In some embodiments, extremely small scales are used to form microchips.

By way of further description, an exemplary method of the invention is outlined in FIG. 25. First, a negative photoresist layer (PR) 250 is spun onto a dielectric substrate 252 (which may be, for example, transparent quartz) followed by a contact-mode lithographic process to transfer the designed SRR pattern as a mold 253, as shown in cross section in FIG. 25(a). Although the exemplary mold pattern 253 forms a SRR, other patterns may likewise be formed, including DRR, LRR, and C-shaped, for example. After the first lithographic process, 100 nm chromium and 1 μm thick copper conductor layers 254 are deposited to fill inside the mold and cover the layer 250, as illustrated in FIG. 25(b). Next, a lift-off process is employed to transfer an SRR layer patterned on the double-side polished quartz substrate, as shown in FIG. 25(c). FIG.

25(*d*) shows a top view of the structure at this point to better illustrate the thus formed DRR.

Next, the topography is planaraized by applying a spin-on glass layer 256 as shown in FIG. 25(*e*). Another layer of PR 258 is formed on the layer 256, and a second lithographic process are applied to form the mold 257 of plasmonic wires shown in FIG. 25(*f*), and a conductor layer 260 such as copper are deposited as shown in FIG. 25(*g*). An exemplary thickness is 1 μm. After a second metal evaporation and lift-off step, the substantially straight metallic thin wires 262 formed in the mold 257 on the top of SRR structures isolated by a layer of spin-on glass 256 is generated as shown in FIG. 25(*h*). A top view is shown in FIG. 25(*i*).

By repeating these exemplary steps, a series of repeated SRRs and thin wires can be fabricated. Or, these steps may be applied to simultaneously form a plurality of unit cells as illustrated in FIG. 25 arranged in an array. A metamaterial comprising a plurality or multitude of individual cells such as illustrated in FIG. 25 may thus be fabricated. This and other MEMS fabrication techniques of the invention provide an effective approach to integrate these two microstructured building blocks to form high frequency NIMs.

E(6) Spatial Filtering with NIMs

One exemplary application for passive NIMs of the invention is spatial filtering in which an incident field distribution undergoes processing by a planar material. The concept of spatial filtering is illustrated in FIG. 26, with traditional (a) spatial filtering illustrated in FIG. 26(*a*), and spatial filtering using a NIM of the invention in FIG. 26(*b*). The NIM device shown in FIG. 26(*b*) is formed from compensating bilayers of anisotropic NIMs. It has been discovered that a composite comprising one or more types of anisotropic NIMs can compactly perform the same spatial filtering function as a traditional multi-element conventional system. A thin planar (passive) NIM slab is selected for one or more angles of incidence. Such a material may be suitably integrated into a structure, such as a radome, to find application in reducing detection of RF communications, for example.

Figure 27:
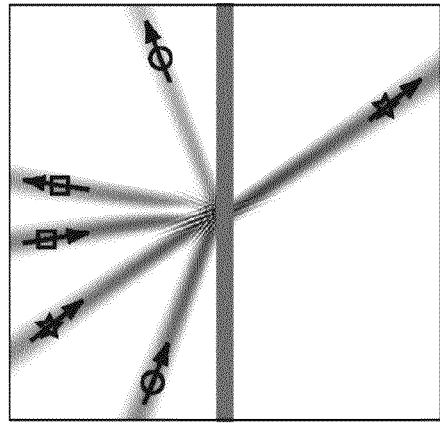
FIG. 27 is useful to illustrate properties of an exemplary metamaterial of the invention.

FIG. 27 schematically illustrates reflection and transmission of Gaussian beams incident on a band pass filter. The beams have width 10λ and incident angles 9° (squares), 34° (stars), and 69° (circles). To achieve the function illustrated in FIG. 27, four distinct planar layers of anisotropic NIMs of the invention are assembled together. This application requires considerable control over the fabrication of the planar NIM structures, and thus takes advantage of methods of the invention to effectively fabricate NIM devices.

E(7) Dynamic Tuning of Metamaterials Through Active Components

An additional aspect of the present invention is directed to use of active components in metamaterials, including in NIM's. Exemplary NIM's of the invention include embedded active and non-linear devices to achieve external control of some of the response parameters of the NIMs. Active control of the effective index can be achieved, for example, by embedding gain elements in either the electric-field or magnetic-field elements of an SRR/continuous-wire based NIM. This is a more complicated construct than the linear-response NIMs which do not include any discrete active components.

The active elements should be embedded in a fashion that does not overly perturb the electric and magnetic field distributions and maintains control over gain and phase shift in the active elements. Another complication is presented by the need to provide power and ground contacts for the active elements without disturbing the electromagnetic properties of the NIM at the relevant negative index band of frequencies. In exemplary NIMs of the present invention, the relevant power and ground leads are added by interspersing the power leads, designed with tuning stubs that yield high (non-transmissive) impedances in the negative-index band, yet maintain low impedance at low (power) frequencies. The nonlinear and gain elements are integrated with both the continuous wire and the SRR constructs of the NIM material: Varactor diodes may be placed in the capacitive gap region of the magnetically-active SRRs, as may PIN diodes. HEMT transistors may be used to either amplify the electric field signal by embedding them in the wire sections of the LHM, or alternatively may be used to amplify the magnetic field component by embedding them in the rings of the SRR elements.

Exemplary active elements believed useful include the Agilent ATF50000 and ATF30000 series pseudomorphic HEMT transistors, which typically have gain of 15-35 dB in the 1-6 GHz band and somewhat less gain but operable up to 18 GHz. High frequency PIN diodes from the same manufacturer may allow two-terminal implementations for beam steering and wave phase shifting. Varactor diodes from MicroSemi (MTV2100 and the GC1500A) will be employed to enable tunability of the capacitive part of a SRR/wire implementation. More than one active component may be embedded, with an example including one active component embedded in a ring conductor gap and a second embedded in a straight wire conductor lattice.

Figure 28:
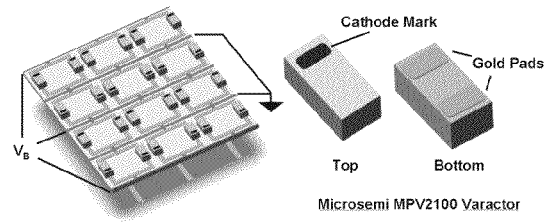
FIG. 28 is useful to illustrate properties of an exemplary metamaterial of the invention.

A schematic illustration of one exemplary active NIM operating in the X-Band microwave range is shown in FIG. 28. Microsemi varactors, voltage-biased variable capacitors with 4:1 tuning range with pF capacitance are shown on the right. The package is an industry standard 0402 size, suitably handled with commercial pick and place machines for high volume assembly. On the left is illustrated the active NIM assembly. A layer of copper wires used for the electric permittivity is shown (unsupported for clarity) below the split ring assembly plane. A 3×4 array of split rings with two gaps per ring is shown on the circuit board substrate. A varactor spans each gap, providing a dynamically tunable capacitance. The varactors are tuned by applying a voltage up to 20 V. This bias voltage is supplied by the lines shown in FIG. 28. Because essentially no current flows (beyond charging initial capacitance), a very low conductivity line can be used to provide the bias. The high resistivity of the lines will prevent the shorting out of adjacent cells by the control lines. Highly inductive lines which present high impedance to the RF, but low impedance to the control signals might also be used, but present fabrication challenges. A number of low conductivity materials can be used, including polymer-based conductors or granular graphitic materials. Note that the bias lines are alternately biased to $V_b$ and ground, and that the physical orientations of varactors in alternating rows are reversed to accommodate the simplified means of cell biasing.

E(8) Reduced Loss Metamaterials Via Active Circuits

Active circuits can be applied to balance the resistive losses in resistive networks. This potentially important technique may have value across all frequency ranges, especially in the optical where pumped materials are easily obtained. However, at low frequencies, the technique can be studied and developed using off-the-shelf amplifiers and equivalent components, allowing the basic concepts of controlled losses to be explored.

Figure 29:
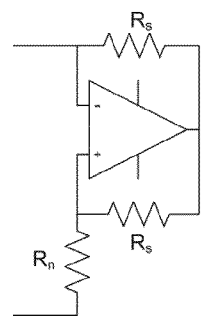
FIG. 29 is useful to illustrate properties of an exemplary metamaterial of the invention.

Negative Impedance Converters (NICs) are known in the art. A simple schematic is shown in FIG. 29. In essence, the NIC works by using a linear amplifier to drive a reverse current in response to an applied voltage. Thus the current flowing through the circuit resistance (and therefore losing power as $I^2R$) is compensated by feeding power (derived from the amplifier power source) back into the circuit. Such a circuit can compensate for resistive losses so long as the system operates within the linear region of the amplifier. The NIC must operate at the frequency of interest. Use of a NIC to compensate for losses in NIMs has been proposed theoretically. Availability of higher frequency amplifiers and components will extend the usefulness of the technique to shorter wavelengths.

If a net phase response is present in the circuit, then that phase response adds to that of the remainder of the material, and can be used to further control the negative index characteristics of the material. Such a circuit may be restricted to operation at frequencies where the basic components needed operate, e.g. in the low GHz range. The size of the components may also restrict their usage to the longer wavelengths.

E(9) Nonlinear Metamaterials

The combination of nonlinearity with metamaterial structures, which themselves possess frequency dispersion, can lead to potentially useful types of behavior. For example, because the local electric fields are considerably enhanced in the capacitive regions of the resonant metamaterial elements, a nonlinear material strategically positioned in such a structure can be strongly enhanced. It has been shown that if a material possessing a Kerr nonlinearity (i.e., an index that has the form $n = n_1 + n_2 E^2$) is embedded into an array of SRRs, then a form of optical bistability can result.

Figure 30:
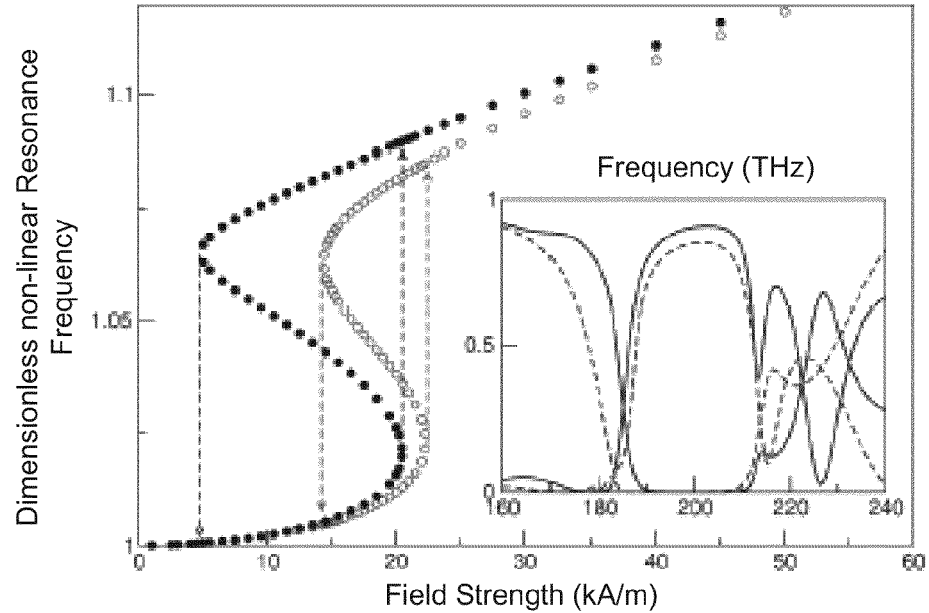
FIG. 30 is useful to illustrate properties of an exemplary metamaterial of the invention; and, FIG. 31 schematically illustrates an aspect of an exemplary metamaterial of the invention.

While there are a variety of nonlinear materials available toward optical frequencies (e.g., $Ba_x Sr_{1-x} TiO_3$), it is advantageous in one exemplary targeted frequency range to utilize diode or similar solid-state elements to achieve the desired nonlinear response. An aspect of the present invention is directed to a nonlinear NIM that makes use of an embedded diode circuit to introduce the analogous Kerr nonlinearity into the SRR medium. The composite material will exhibit a refractive index that will be switchable from positive to negative based on the intensity of an incident field. Because the use of active components such as diodes needs to be carefully biased and balanced, the range of operation in terms of incident intensity is believed to be narrowly prescribed. FIG. 30 illustrates dimensionless nonlinear resonance frequency versus field strength for two values of the resonance quality factor. The curves show the potential for bistable behavior in the (intensity dependent) resonance frequency.

While the narrow bandwidth of NIMs can be a limitation for linear frequency domain applications, an alternative approach to leveraging the unique properties of NIMs is to search for wave propagation phenomena and applications that make use of the dispersive properties of NIMs. Electromagnetic pulses, for example, contain a band of frequency components so that the shape of the pulse is in general altered by transmission through a dispersive medium. A pulse interacting with a NIM will undergo a negative phase shift for each frequency component that lies within the negative index band. While there is no particular distinction between pulses that propagate entirely within linear negative versus positive index media, there are NIM structures that can have a significant impact on wave propagation, including exemplary NIM's of the invention.

Examples include structures that are formed from the combination of dispersive positive and negative materials. Another class of structures is NIMs with nonlinearities. A variety of applications have been suggested for NIMs that exhibit different types of nonlinearity. At low frequencies, as in the previous examples, nonlinear components—such as properly biased diodes—can be utilized to produce negative index metamaterials that exhibit nonlinear response to incident electromagnetic fields.

E(10) Active High Frequency NIMs

There are two preferred routes for embedding active control and nonlinear elements in a NIM: integration of discrete electronic components with circuit-board-based NIM structures, as discussed above, and the integration of NIM structures with custom-fabricated semiconductor materials, the latter including active elements. The former approach, using discrete components, is simpler to implement and to test design methodologies, but may be limited to frequencies below 20 GHz. The latter approach, with custom-fabricated active elements lithographically patterned on the same semiconductor substrate as the LHM structures, will ultimately allow much higher central operating frequencies for the active elements, which may approach 100-200 GHz and above, but engenders significantly higher costs and longer lead times in the development effort.

Alternatively, approaches combining the two, involving the use of discrete but unpackaged components, with chip die sizes of order 100 μm, may allow significantly higher frequency operation with sufficiently sophisticated circuit-board-like technology, using perhaps semiconductor (e.g. Si and poly-Si) substrates patterned using MEMS technology, enabling the addition of vias and the corresponding interconnect capability, to the rigid, ultraflat surface afforded by a highly polished rigid semiconductor.

E(11) Tunable THz NIMs

Figure 31:
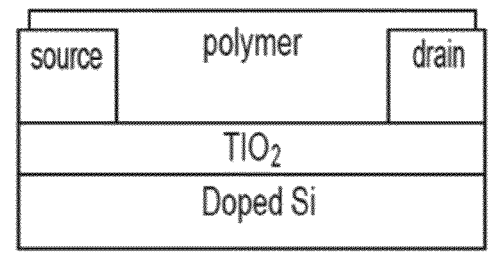

The dielectric function of $TiO_2$ can be modified at THz frequencies via an applied electric field. An exemplary device of the invention shown schematically in FIG. 31 has been fabricated for this purpose. A 2000 Angstrom layer of $TiO_2$ was grown using physical vapor deposition (PVD) process on doped Si, which serves as the bottom electrode. The role of the top electrode in this structure is played by a film of Poly3-hexylthiophene (P3HT), which is an insulator. However, P3HT reveals significant electrical conductivity at room temperature when charges are injected through field-effect doping. This FET geometry has been adapted for THz and infrared studies of $TiO_2$ under an applied electric field. The novelty of the device includes the large area (>1 cm$^2$) "grid-electrode" structure that is suitable for transmission experiments from far-IR to near-IR with the latter cut-off imposed by the band gap of Si substrate. With the concentration of dopants in the $10^{18}$ cm$^{-3}$ range, the substrate and therefore the entire device structure shows high transmission $T(\omega) \cong 20$-30% from sub-THz up to the band gap energy of Si.

Changes in transmission occur in the device due to modification of the THz response of $TiO_2$ by an applied electric field. These changes have the form of resonances occurring close to the vibrational frequencies of $TiO_2$, where field-induced modification of $\in_1(\omega)$ can exceed 50-80%. Notably, SRR arrays can be readily integrated in the bottom-contact FET geometry thus enabling this novel approach to the device tunabilty.

While specific embodiments of the present invention are shown and described herein, it should be understood that other modifications, substitutions and alternatives are apparent to one of ordinary skill in the art. Such modifications, substitutions and alternatives can be made without departing from the spirit and scope of the invention, which should be determined from the appended claims.

The invention claimed is:
1. An electromagnetic apparatus, comprising:
   a varied plurality of resonator elements respectively providing a varied plurality of magnetic polarizations in response to electromagnetic waves, the varied plurality of resonator elements having inter-element spacings substantially less than a free-space wavelength corresponding to a frequency of the electromagnetic waves.

2. The electromagnetic apparatus of claim 1, where the frequency is a radio frequency.

3. The electromagnetic apparatus of claim 1, where the frequency is a microwave frequency.

4. The electromagnetic apparatus of claim 1, wherein the frequency is a mm-wave frequency.

5. The electromagnetic apparatus of claim 1, wherein the frequency is a THz frequency.

6. The electromagnetic apparatus of claim 1, wherein the varied plurality of resonator elements is arranged as unit cells, and the resonator elements have a cell-by-cell variation of physical properties to provide a cell-by-cell variation of the magnetic polarizations.

7. The electromagnetic apparatus of claim 6, wherein the cell-by-cell variation of physical properties is a cell-by-cell variation of one or more dimensions of the resonator elements.

8. The electromagnetic apparatus of claim 6, wherein the resonator elements include conducting structures in a dielectric environment, and the cell-by-cell variation of physical properties is a cell-by-cell variation of the dielectric environment.

9. The electromagnetic apparatus of claim 8, wherein the cell-by-cell variation of physical properties is a cell-by-cell variation in resonant frequencies of the resonator elements.

10. The electromagnetic apparatus of claim 9, wherein the resonator elements include conducting structures having characteristic inductances L and capacitances C, and the resonant frequencies are resonant LC frequencies of the conducting structures.

11. The electromagnetic apparatus of claim 6, wherein the resonator elements include discrete capacitors, and the cell-by-cell variation of physical properties is a cell-by-cell variation of capacitances of the discrete capacitors.

12. The apparatus of claim 11, wherein the discrete capacitors are single-layer capacitors.

13. The electromagnetic apparatus of claim 6, wherein the cell-by-cell variation of the magnetic polarizations defines a cell-by-cell variation of magnetic permeability.

14. The electromagnetic apparatus of claim 6, wherein the cell-by-cell variation of the magnetic polarizations defines a cell-by-cell variation of refractive index.

15. The electromagnetic apparatus of claim 14, wherein the cell-by-cell variation of refractive index defines an effective refractive index that varies linearly with distance along an axis.

16. The electromagnetic apparatus of claim 14, wherein the cell-by-cell variation of refractive index defines an effective refractive index that varies parabolically with distance along an axis.

17. An electromagnetic apparatus, comprising:
a plurality of adjustable resonator elements respectively providing a plurality of magnetic polarizations in response to electromagnetic waves, the plurality of adjustable resonator elements having inter-element spacings substantially less than a free-space wavelength corresponding to a frequency of the electromagnetic waves.

18. The electromagnetic apparatus of claim 17, where the frequency is a radio frequency.

19. The electromagnetic apparatus of claim 17, where the frequency is a microwave frequency.

20. The electromagnetic apparatus of claim 17, wherein the frequency is a mm-wave frequency.

21. The electromagnetic apparatus of claim 17, wherein the frequency is a THz frequency.

22. The electromagnetic apparatus of claim 17, wherein the plurality of adjustable resonator elements is arranged as unit cells, and the adjustable resonator elements have cell-by-cell adjustable physical properties to provide a cell-by-cell variation of the magnetic polarizations.

23. The electromagnetic apparatus of claim 22, wherein the resonator elements contain active devices, and the cell-by-cell adjustable physical properties are adjustable biases of the active devices.

24. The electromagnetic apparatus of claim 23, wherein the active devices include diodes.

25. The electromagnetic apparatus of claim 24, wherein the diodes are varactor diodes.

26. The electromagnetic apparatus of claim 24, wherein the diodes are PIN diodes.

27. The electromagnetic apparatus of claim 23, wherein the active devices include transistors.

28. The electromagnetic apparatus of claim 27, wherein the transistors are high-electron mobility transistors.

29. The electromagnetic apparatus of claim 23, further comprising voltage leads for the active devices.

30. The electromagnetic apparatus of claim 29 wherein the voltage leads include tuning stubs that yield high impedance at the frequency of the electromagnetic waves and low impedance at a lower frequency.

31. The electromagnetic apparatus of claim 29, wherein the voltage leads are very low conductivity lines.

32. The electromagnetic apparatus of claim 31, wherein the very low conductivity lines are polymer-based conductors.

33. The electromagnetic apparatus of claim 32, where the very low conductivity lines are composed of granular graphitic materials.

34. The electromagnetic apparatus of claim 33, further comprising first voltage leads connected to the first conductors and second voltage leads connected to the second conductors.

35. The electromagnetic apparatus of claim 23, wherein the resonator elements include conducting structures having first conductors and second conductors that are disconnected from the first conductors, and the active devices are connected between the first and second conductors.

36. The electromagnetic apparatus of claim 22, wherein the cell-by-cell adjustable physical properties are cell-by-cell adjustable resonant frequencies of the resonator elements.

37. A method, comprising:
adjusting a plurality of resonator elements whereby to adjust a respective plurality of magnetic polarizations of the resonator elements in response to electromagnetic waves, the plurality of adjustable resonator elements having inter-element spacings substantially less than a free-space wavelength corresponding to a frequency of the electromagnetic waves.

38. The method of claim 37, wherein the resonator elements are arranged as unit cells, and the adjusting of the plurality of resonator elements is a cell-by-cell adjusting of the plurality of resonator elements.

39. The method of claim 38, wherein the cell-by-cell adjusting of the plurality of resonator elements is a cell-by-cell adjusting of resonant frequencies of the resonator elements.

40. The method of claim 38, wherein the resonator elements contain active devices, and the cell-by-cell adjusting of the plurality of resonator elements includes cell-by-cell adjusting of biases of the active devices.

41. The method of claim 40, wherein the cell-by-cell adjusting of the biases of the active elements includes cell-by-cell adjusting of voltages applied to voltage leads of the active devices.

42. The method of claim 40, wherein the resonant elements include conducting structures having first conductors and second conductors that are disconnected from the first conductors, the active devices are connected between the first and second conductors, and the cell-by-cell adjusting of the biases of the active devices includes cell-by-cell adjusting of voltage differences applied between the first and second conductors.

* * * * *

UNITED STATES PATENT AND TRADEMARK OFFICE
CERTIFICATE OF CORRECTION

PATENT NO. : 8,830,556 B2  
APPLICATION NO. : 13/229092  
DATED : September 9, 2014  
INVENTOR(S) : David R. Smith et al.

It is certified that error appears in the above-identified patent and that said Letters Patent is hereby corrected as shown below:

In the Specification:

Col. 3, line 54   Please delete "etama-" and insert --metama- -- therefor.

Col. 15, line 24   After "lens", please delete "an" and insert --can-- therefor.

Signed and Sealed this  
Twenty-fourth Day of February, 2015

Michelle K. Lee  
*Deputy Director of the United States Patent and Trademark Office*